US012779597B2

(12) United States Patent
Suzuki

(10) Patent No.: US 12,779,597 B2
(45) Date of Patent: Nov. 3, 2026

(54) TEACHING DEVICE AND TEACHING METHOD FOR TEACHING OPERATION OF LASER MACHINING DEVICE, AND DEVICE AND METHOD FOR GENERATING INTERFERENCE CONFIRMATION PROGRAM

(71) Applicant: Fanuc Corporation, Yamanashi (JP)

(72) Inventor: Youhei Suzuki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 311 days.

(21) Appl. No.: 18/693,803

(22) PCT Filed: Sep. 30, 2021

(86) PCT No.: PCT/JP2021/036157
§ 371 (c)(1),
(2) Date: Mar. 20, 2024

(87) PCT Pub. No.: WO2023/053348
PCT Pub. Date: Apr. 6, 2023

(65) Prior Publication Data

US 2025/0135586 A1 May 1, 2025

(51) Int. Cl.
*B23K 26/70* (2014.01)
*G05B 13/02* (2006.01)

(52) U.S. Cl.
CPC ........ *B23K 26/702* (2015.10); *G05B 13/0265* (2013.01)

(58) Field of Classification Search
CPC .......................... B23K 26/702; G05B 13/0265
See application file for complete search history.

(56) References Cited

U.S. PATENT DOCUMENTS

2005/0187652 A1 8/2005 Yamazaki et al.
2015/0158121 A1 6/2015 Di Cairano et al.
(Continued)

FOREIGN PATENT DOCUMENTS

CN 104360429 A 2/2015
JP 2006346740 A 12/2006
(Continued)

OTHER PUBLICATIONS

International Search Report (PCT/ISA/210) with English translation and Written Opinion (PCT/ISA/237) mailed on Nov. 9, 2021, by the Japanese Patent Office as the International Searching Authority for International Application No. PCT/JP2021/036157.

*Primary Examiner* — Mark A Connolly
(74) *Attorney, Agent, or Firm* — BUCHANAN INGERSOLL & ROONEY PC

(57) ABSTRACT

A teaching device includes: a model data acquisition unit that acquires an object model; an input receiving unit that receives input of an interference detection condition for detecting interference between a virtual laser beam and the object model in a virtual laser machining operation in which the virtual laser beam is simulatively irradiated at a machining location; and an interference detection unit that detects interference occurring in the virtual laser machining operation on the basis of the received interference detection condition. The interference detection condition includes a beam size of the virtual laser beam, or an invalid region set in the object model for invalidating the interference detection.

7 Claims, 14 Drawing Sheets

(56) References Cited

U.S. PATENT DOCUMENTS

| | | | | |
|---|---|---|---|---|
| 2016/0299491 | A1 | 10/2016 | Kobayashi | |
| 2019/0126328 | A1 | 5/2019 | Barclay et al. | |
| 2020/0096968 | A1 | 3/2020 | Yoshida et al. | |
| 2021/0096534 | A1* | 4/2021 | Katsumoto ........ | G05B 19/4062 |
| 2023/0381896 | A1* | 11/2023 | Magg ................... | B23K 31/125 |

FOREIGN PATENT DOCUMENTS

| | | | |
|---|---|---|---|
| JP | 2018130729 | A | 8/2018 |
| JP | 2019111580 | A | 7/2019 |
| JP | 2020-032456 | A | 3/2020 |
| JP | 2020035404 | A | 3/2020 |
| JP | 2020052624 | A | 4/2020 |
| TW | 201521929 | A | 6/2015 |

* cited by examiner

TEACHING DEVICE AND TEACHING METHOD FOR TEACHING OPERATION OF LASER MACHINING DEVICE, AND DEVICE AND METHOD FOR GENERATING INTERFERENCE CONFIRMATION PROGRAM

CROSS REFERENCE TO RELATED APPLICATIONS

This is the U.S. National Phase application of PCT/JP2021/036157, filed Sep. 30, 2021, the disclosures of this application being incorporated herein by reference in their entireties for all purposes.

FIELD OF THE INVENTION

The present disclosure relates to a teaching device and a teaching method of teaching an operation of a laser processing machine, and a device for and a method of generating an interference verification program.

BACKGROUND OF THE INVENTION

A teaching device that teaches operation of a laser processing machine is known (e.g., Patent Literature 1).

PATENT LITERATURE

PTL 1: JP 2020-35404 A

SUMMARY OF THE INVENTION

There is known demand for a technique for effectively validating interference between a laser beam emitted from a laser processing machine and an object (e.g., a jig) existing in a work cell.

In one aspect of the present disclosure, a teaching device configured to teach an operation of a laser processing machine that performs a laser process on an object includes: a model data acquisition unit configured to acquire an object model modeling the object; an input receiving unit configured to receive an input of an interference detection condition for detecting interference between a virtual laser beam and the object model in a virtual laser process operation in which the virtual laser beam is simulatively irradiated onto a process location set in the object model; and an interference detecting unit configured to detect the interference generated in the virtual laser process operation based on the interference detection condition received by the input receiving unit, in which the interference detection condition includes a beam size of the virtual laser beam, or an invalid area to be set for the object model to invalidate detection of the interference.

In another aspect of the present disclosure, in a method of teaching an operation of a laser processing machine that performs a laser process on an object, a processor is configured to: acquire model data of an object model modeling the object; receive an input of an interference detection condition for detecting interference between a virtual laser beam and the object model in a virtual laser process operation in which the virtual laser beam is simulatively irradiated onto a process location set in the object model; and detect the interference generated in the virtual laser process operation based on the interference detection condition received, and the interference detection condition includes a beam size of the virtual laser beam, or an invalid area to be set for the object model to invalidate detection of the interference.

In still another aspect of the present disclosure, a device configured to generate an interference verification program configured to cause a laser processing machine configured to execute a laser process operation to perform a laser process on a process location set on a workpiece to execute an interference verification operation for preliminarily verifying interference between a laser beam and an environmental object includes: an input receiving unit configured to receive an input of an operation parameter for the interference verification operation; an operation speed setting unit configured to set an operation speed of the laser processing machine in the interference verification operation to a speed lower than that in the laser process operation based on the operation parameter received by the input receiving unit; and a program generating unit configured to generate the interference verification program defining a command for operating the laser processing machine at the operation speed set by the operation speed setting unit in the interference verification operation and irradiating the process location with a laser beam having an optical characteristic different from that in the laser process operation.

In still another aspect of the present disclosure, in a method of generating an interference verification program configured to cause a laser processing machine configured to execute a laser process operation to perform a laser process on a process location set on a workpiece to execute an interference verification operation for preliminarily verifying interference between a laser beam and an environmental object, a processor is configured to: receive an input of an operation parameter for the interference verification operation; set an operation speed of the laser processing machine in the interference verification operation to a speed lower than that in the laser process operation based on the operation parameter received; and generate the interference verification program defining a command for operating the laser processing machine at the set operation speed in the interference verification operation and irradiating the process location with a laser beam having an optical characteristic different from that in the laser process operation.

According to the present disclosure, it becomes possible to effectively validate interference between a laser beam that can be generated and an object.

DETAILED DESCRIPTION OF EMBODIMENTS OF THE INVENTION

Figure 1:
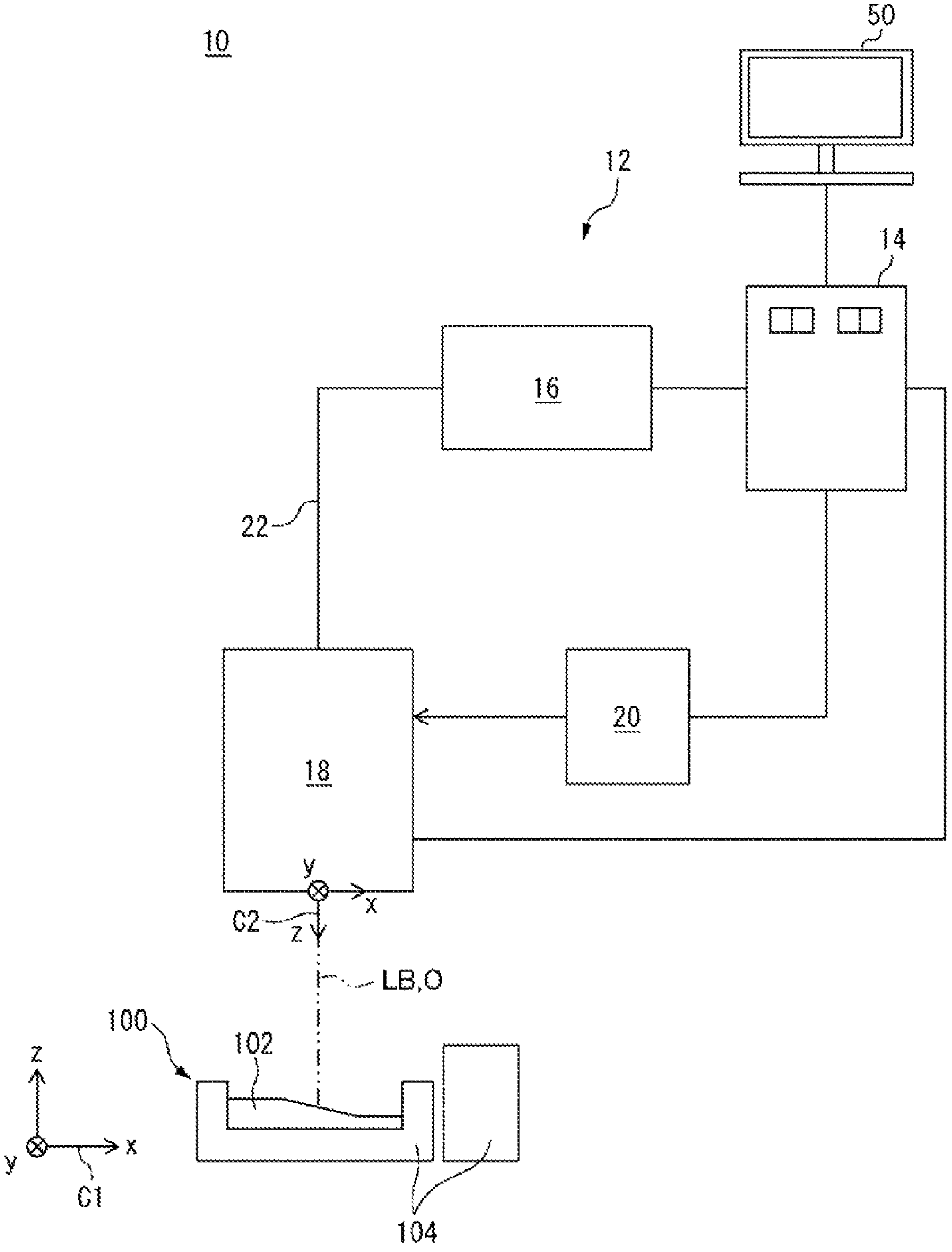
FIG. 1 is a diagram of a laser processing system according to an embodiment.

Embodiments of the present disclosure are described in detail below with reference to the drawings. Note that in various embodiments described below, the same elements are denoted with the same reference numerals, and overlapping description is omitted. First, a laser processing system 10 according to an embodiment will be described with reference to FIG. 1 to FIG. 3. The laser processing system 10 includes a laser processing machine 12, a controller 14, and a teaching device 50.

Under a command from the controller 14, the laser processing machine 12 irradiates a process location PL set on a workpiece 102 with a laser beam LB, and performs laser process (laser welding, laser cutting, and the like) on the process location PL with the laser beam LB. Specifically, the laser processing machine 12 includes a laser oscillator 16, a laser irradiation device 18, and a moving mechanism 20.

The laser oscillator 16 is a solid-state laser oscillator (e.g., a YAG laser oscillator or a fiber laser oscillator), a gas laser oscillator (e.g., a carbon dioxide laser oscillator), or the like and internally generates a laser beam LB by optical resonance and supplies the laser beam LB to the laser irradiation device 18 through a light guide member 22 in response to a command from the controller 14. The light guide member 22 includes, for example, at least one of an optical fiber, a light guide path made of a hollow or transparent material, a reflecting mirror, and an optical lens and guides the laser beam LB to the laser irradiation device 18.

Figure 3:
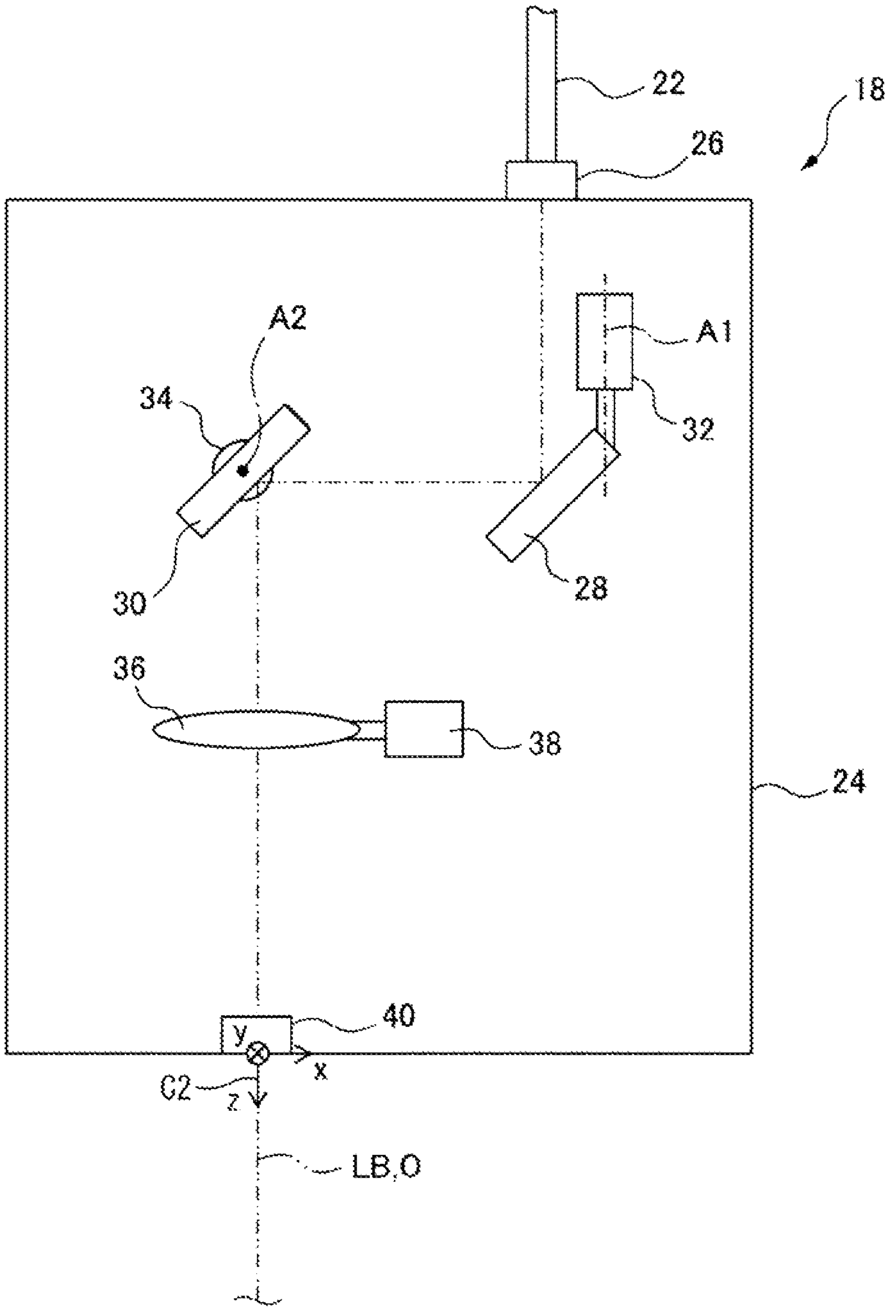
FIG. 3 illustrates an example of a laser irradiation device illustrated in FIG. 1.

The laser irradiation device 18, which is a laser scanner (galvano scanner), a laser process head having a nozzle that emits a laser beam and an assist gas, or the like, focuses the laser beam LB supplied from the laser oscillator 16 and irradiates the workpiece 102 with the laser beam LB. FIG. 3 schematically illustrates a configuration of the laser irradiation device 18 as a laser scanner. The laser irradiation device 18 illustrated in FIG. 3 includes a housing 24, a light receiving part 26, mirrors 28 and 30, mirror driving devices 32 and 34, an optical lens 36, a lens driving device 38, and a laser beam emitting part 40.

The housing 24 is hollow and its interior defines a propagation path for the laser beam LB. The light receiving part 26 is provided at the housing 24 and receives the laser beam LB propagated through the light guide member 22. The mirror 28 is provided inside the housing 24 such that it is rotatable about an axis A1. The mirror 28 reflects the laser beam LB, which has entered the housing 24 through the light receiving part 26, toward the mirror 30. The mirror driving device 32 is, for example, a servo motor and rotates the mirror 28 about the axis A1 in response to a command from the controller 14.

On the other hand, the mirror 30 is provided inside the housing 24 such that it is rotatable about an axis A2. The axis A2 may be substantially orthogonal to the axis A1. The mirror 30 reflects the laser beam LB reflected by the mirror 28 toward the optical lens 36. The mirror driving device 34 is, for example, a servo motor and rotates the mirror 30 about the axis A2 in response to a command from the controller 14. Generally, the mirrors 28 and 30 may be referred to as galvanometer mirrors and the mirror driving devices 32 and 34 may be referred to as galvanometer motors.

The optical lens 36 includes a focus lens or the like and focuses the laser beam LB. In the present embodiment, the optical lens 36 is supported in the housing 24 such that it is movable in the direction of an optical axis O of the incident laser beam LB. The lens driving device 38, which includes a piezoelectric element, an ultrasonic vibrator, and an ultrasonic motor, displaces the optical lens 36 in the direction of the optical axis O in response to a command from the controller 14, thereby displacing, in the direction of the optical axis O, a focal point FP of the laser beam LB with which the workpiece 102 is irradiated. The laser beam emitting part 40 emits the laser beam LB focused by the optical lens 36 out of the housing 24.

With reference to FIGS. 1 and 2 again, the moving mechanism 20 includes, for example, a servo motor, and moves the laser irradiation device 18 relative to the workpiece 102. For example, the moving mechanism 20 is an articulated robot that can move the laser irradiation device 18 to an arbitrary position in a moving mechanism coordinate system C1. Alternatively, the moving mechanism 20 may include a plurality of ball screw mechanisms that move the laser irradiation device 18 along an x-y plane of the moving mechanism coordinate system C1 and move it in a z-axis direction of the moving mechanism coordinate system C1.

The moving mechanism coordinate system C1 is a coordinate system for automatically controlling the operation of the moving mechanism 20, and is set with respect to the moving mechanism 20. On the other hand, a tool coordinate system C2 is set in the laser irradiation device 18. The tool coordinate system C2 is a coordinate system that defines the position of the laser irradiation device 18 in the moving mechanism coordinate system C1. In the present description, "position" may indicate a position and an orientation.

In the present embodiment, the tool coordinate system C2 is set with respect to the laser irradiation device 18 so that the origin thereof is arranged at the center of the laser beam emitting part (the laser beam emitting part 40 in the example illustrated in FIG. 3) of the laser irradiation device 18 and the z axis thereof becomes parallel to (e.g., coincides with) the optical axis O of the laser beam LB emitted from the laser beam emitting part.

Figure 4:
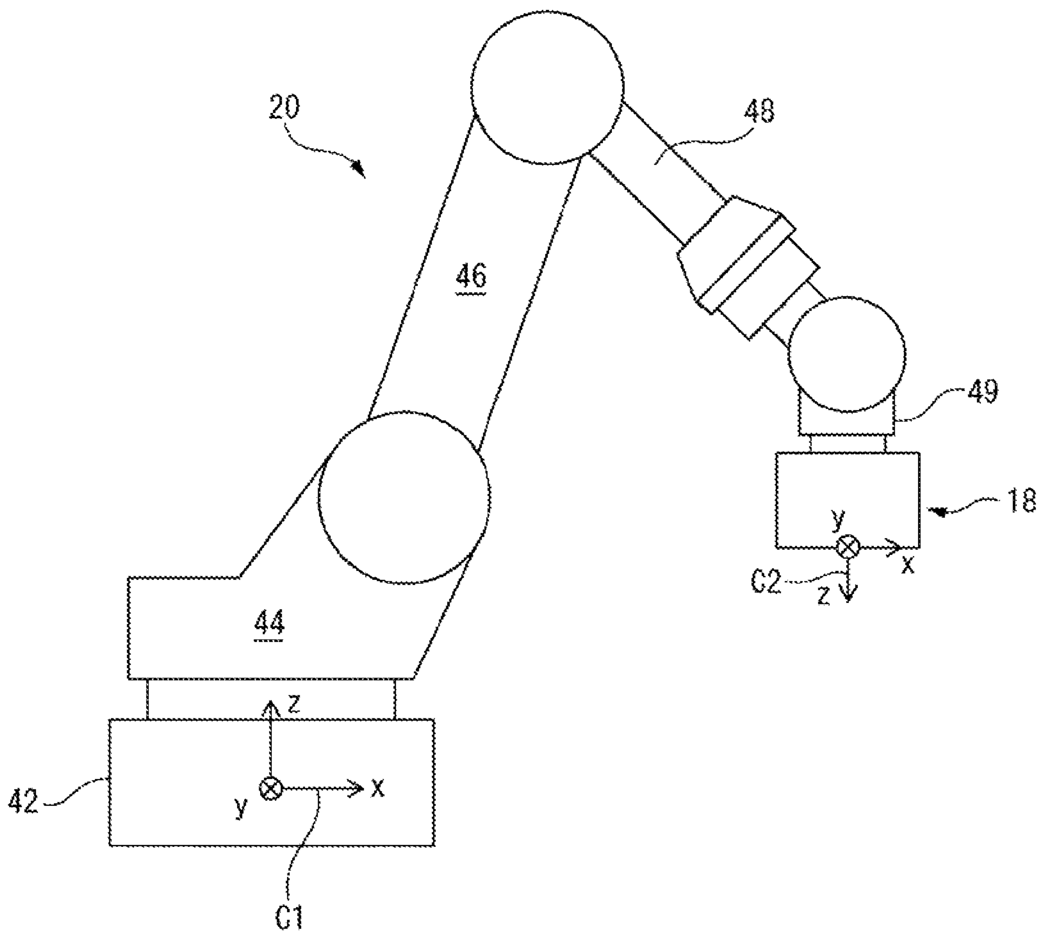
FIG. 4 illustrates an example of a moving mechanism illustrated in FIG. 1.

FIG. 4 schematically illustrates the configuration of the moving mechanism 20 as a vertical articulated robot. The moving mechanism 20 illustrated in FIG. 4 includes a robot base 42, a swivel body 44, a lower arm 46, an upper arm 48, and a wrist 49. The robot base 42 is fixed on the floor of the work cell. The swivel body 44 is provided on the robot base 42 so as to be swivelable about the vertical axis. The lower arm 46 is provided on the swivel body 44 so as to be rotatable about the horizontal axis, and the upper arm 48 is provided on a distal end of the lower arm 46 so as to be rotatable. The wrist 49 is provided at a distal end of the upper arm 48 so as to be rotatable about two axes orthogonal to each other.

Each component (the robot base 42, the swivel body 44, the lower arm 46, the upper arm 48, and the wrist 49) of the moving mechanism 20 is provided with a servo motor (not illustrated), and the servo motor rotationally drives each movable component (the swivel body 44, the lower arm 46, the upper arm 48, and the wrist 49) of the moving mechanism 20 about a drive shaft in response to a command from the controller 14.

With respect to the moving mechanism 20 illustrated in FIG. 4, the moving mechanism coordinate system CA is set such that the origin thereof is arranged at the center of the robot base 42 and the z-axis thereof coincides with the swivel axis of the swivel body 44. When the laser irradiation device 18 is positioned at an arbitrary target position in the moving mechanism coordinate system C1 by the operation of the moving mechanism 20, the controller 14 first sets the tool coordinate system C2 in the moving mechanism coordinate system C1. Next, the controller 14 operates the moving mechanism 20 so as to position the laser irradiation device 18 at a position represented by the tool coordinate system C2 having been set.

Thus, the controller 14 can arrange the laser irradiation device 18 at an arbitrary target position in the moving mechanism coordinate system C1 by the operation of the moving mechanism 20. For convenience, the following description may be made referring to the positive direction of an x-axis of the moving mechanism coordinate system C1 as rightward, the positive direction of a y-axis as frontward, and the positive direction of the z-axis as upward.

The controller 14 controls the operation of the laser processing machine 12. Specifically, the controller 14 is a computer including a processor (such as a CPU or a GPU) and a memory (such as a ROM or a RAM). The controller 14 controls an operation of generating a laser beam by the laser oscillator 16. By operating the mirror driving devices 32 and 34 of the laser irradiation device 18, the controller 14 changes the orientations of each of the mirrors 28 and 30, whereby the laser beam LB with which the workpiece 102 is irradiated can be moved at a high speed with respect to the workpiece 102.

The controller 14 also operates the lens driving device 38 of the laser irradiation device 18 to displace the optical lens 36, thereby moving the focal point FP of the laser beam LB emitted from the laser beam emitting part 40 in the direction of the optical axis O. By operating the moving mechanism 20, the controller 14 moves the laser irradiation device 18 with respect to the workpiece 102.

Figure 2:
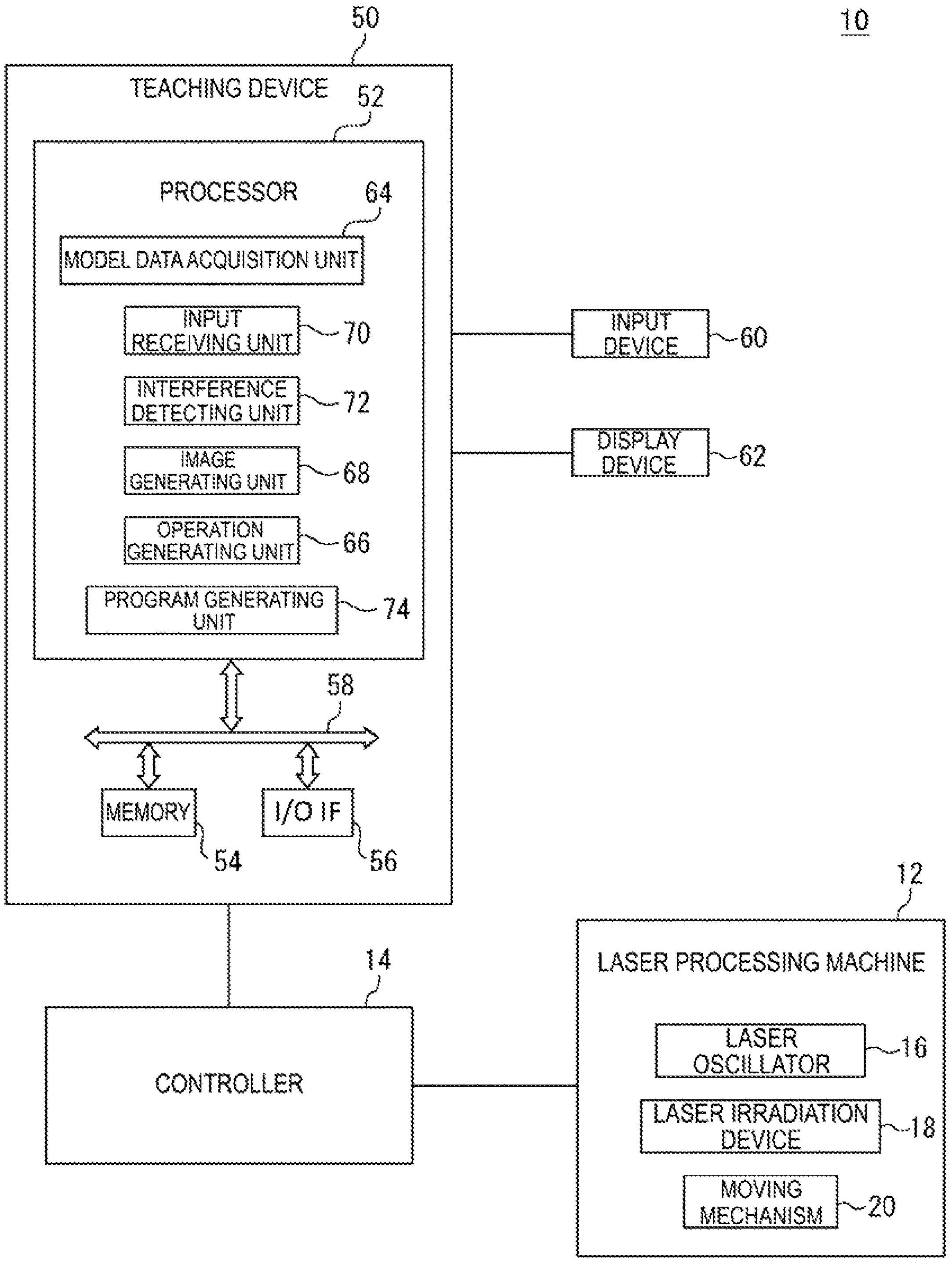
FIG. 2 is a block diagram of the laser processing system illustrated in FIG. 1.

The teaching device 50 is for teaching the operation of the laser processing machine 12. As illustrated in FIG. 2, the teaching device 50 is a computer including a processor 52, a memory 54, and an I/O interface 56. The teaching device 50 may be any type of computer such as a desktop or tablet PC, or a teach pendant.

The processor 52 includes a CPU, GPU, or the like and is communicatively connected to the memory 54 and the I/O interface 56 via a bus 58. The processor 52 performs arithmetic processing for realizing teaching functions that will be described later while communicating with the memory 54 and the I/O interface 56.

The memory 54 includes a RAM, a ROM, or the like and temporarily or permanently stores various data used in arithmetic processing for teaching functions performed by the processor 52 and various data generated during the arithmetic processing. The I/O interface 56 has, for example, an Ethernet (trade name) port, a USB port, an optical fiber connector, or an HDMI (trade name) terminal and communicates data with external devices by wire or wirelessly under a command from the processor 52.

The teaching device 50 is provided with an input device 60 and a display device 62. The input device 60 includes a keyboard, a mouse, a touch panel, or the like and receives data input from an operator. The display device 62 includes a liquid crystal display, an organic EL display, or the like and displays various data.

The input device 60 and the display device 62 are communicatively connected to the I/O interface 56 by wire or wirelessly. The input device 60 and the display device 62 may be provided separately from the housing of the teaching device 50 or may be integrally incorporated into the housing of the teaching device 50.

The processor 52 is configured to send a command to each servo motor of the moving mechanism 20 via the controller 14 in response to input data to the input device 60, and to cause the moving mechanism 20 to perform a jogging operation in response to the command. By operating the input device 60, the operator controls the moving mechanism 20 via the controller 14 and teaches a laser process operation LPO by the laser processing machine 12.

Here, the work cell has various objects 100 including the above-described workpiece 102 and an environmental object 104 arranged around the workpiece 102. The environmental object 104 includes, for example, a jig used to install the workpiece 102 in the work cell, a structure such as a pillar arranged in the work cell, and peripheral equipment arranged around the workpiece 102.

When the controller 14 causes the laser processing machine 12 to operate to execute the laser process operation LPO to perform a laser process on the process location PL of the workpiece 102, it is necessary to avoid interference between the laser beam LB emitted from the laser irradiation device 18 and the environmental object 104. The teaching device 50 teaches the laser process operation LPO of the laser processing machine 12 in consideration of such interference between the laser beam LB and the environmental object 104.

Hereinafter, a method of teaching the laser process operation LPO using the teaching device 50 will be described. First, the operator prepares drawing data of a laser processing machine model 12M modeling the laser processing machine 12 and drawing data of an object model 100M modeling the object 100. The drawing data of the laser processing machine model 12M and the object model 100M are, for example, three-dimensional CAD data.

In the following description, when the name of a member in a real space is "XX", a model of the member will be referred to as "XX model". Therefore, the laser processing machine model 12M includes a laser oscillator model 16M modeling the laser oscillator 16, a laser irradiation device model 18M modeling the laser irradiation device 18, and a moving mechanism model 20M (a robot base model 42M, a swivel body model 44M, a lower arm model 46M, an upper arm model 48M, and a wrist model 49M in the example illustrated in FIG. 3) modeling the moving mechanism 20. The object model 100M includes a workpiece model 102M modeling the workpiece 102 and an environmental object model 104M modeling the environmental object 104.

As an example, the operator may create the laser processing machine model 12M and the object model 100M using a design support device (CAD/CAM device) that is a computer other than the teaching device 50, and download the drawing data of the laser processing machine model 12M and the object model 100M to the teaching device 50 through the I/O interface 56.

As another example, the function of the design support device may be implemented in the teaching device 50 as software, for example, and the operator may create the laser processing machine model 12M and the object model 100M in the teaching device 50 by operating the input device 60 while visually recognizing the display device 62 provided in the teaching device 50.

The processor 52 acquires and stores, in the memory 54 of the teaching device 50, the drawing data of the laser processing machine model 12M and the object model 100M having been downloaded or created. As described above, in the present embodiment, the processor 52 functions as a model data acquisition unit 64 (FIG. 2) configured to acquire the laser processing machine model 12M and the object model 100M.

When the operator operates the input device 60 to input a teaching start command CMt, the processor 52 reads the laser processing machine model 12M and the object model 100M from the memory 54 and arranges them in a virtual space VS. The processor 52 may arrange only the laser irradiation device model 18M and the moving mechanism model 20M among the laser processing machine models 12M in the virtual space VS.

Figure 5:
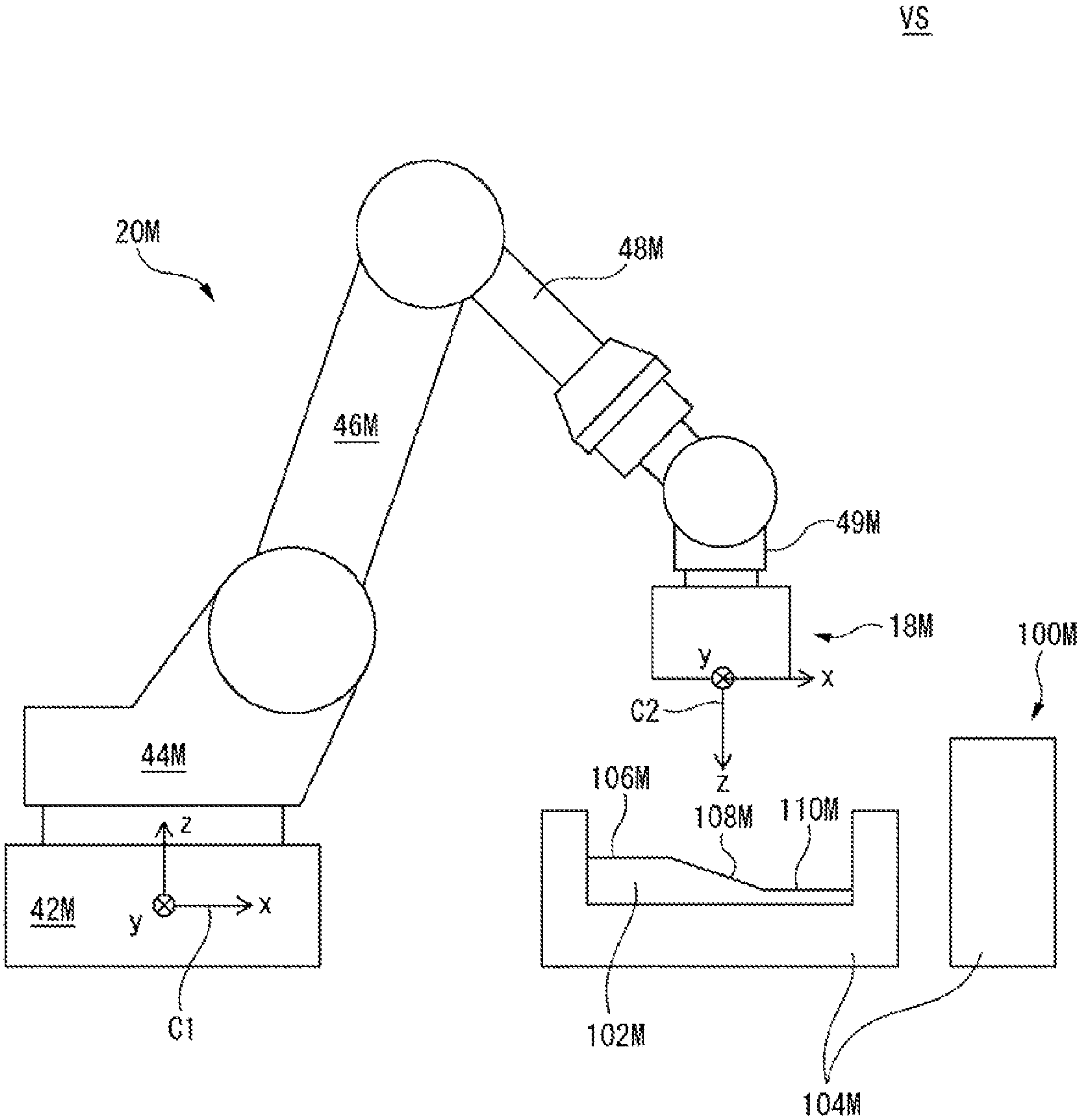
FIG. 5 illustrates an example of a virtual space generated by a teaching device illustrated in FIG. 1.

FIG. 5 illustrates an example of the virtual space VS in which the moving mechanism model 20M of the moving mechanism 20 illustrated in FIG. 4, the laser irradiation device model 18M, and the object model 100M are arranged. In the present embodiment, the workpiece model 102M includes a plurality of surface models 106M, 108M, and 110M connected to one another.

The processor 52 sets the moving mechanism coordinate system C1 and the tool coordinate system C2 in a positional relationship illustrated in FIG. 4 with respect to the moving mechanism model 20M and the laser irradiation device model 18M arranged in the virtual space VS. The processor 52 generates and displays, on the display device 62, image data of the constructed virtual space VS.

Figure 6:
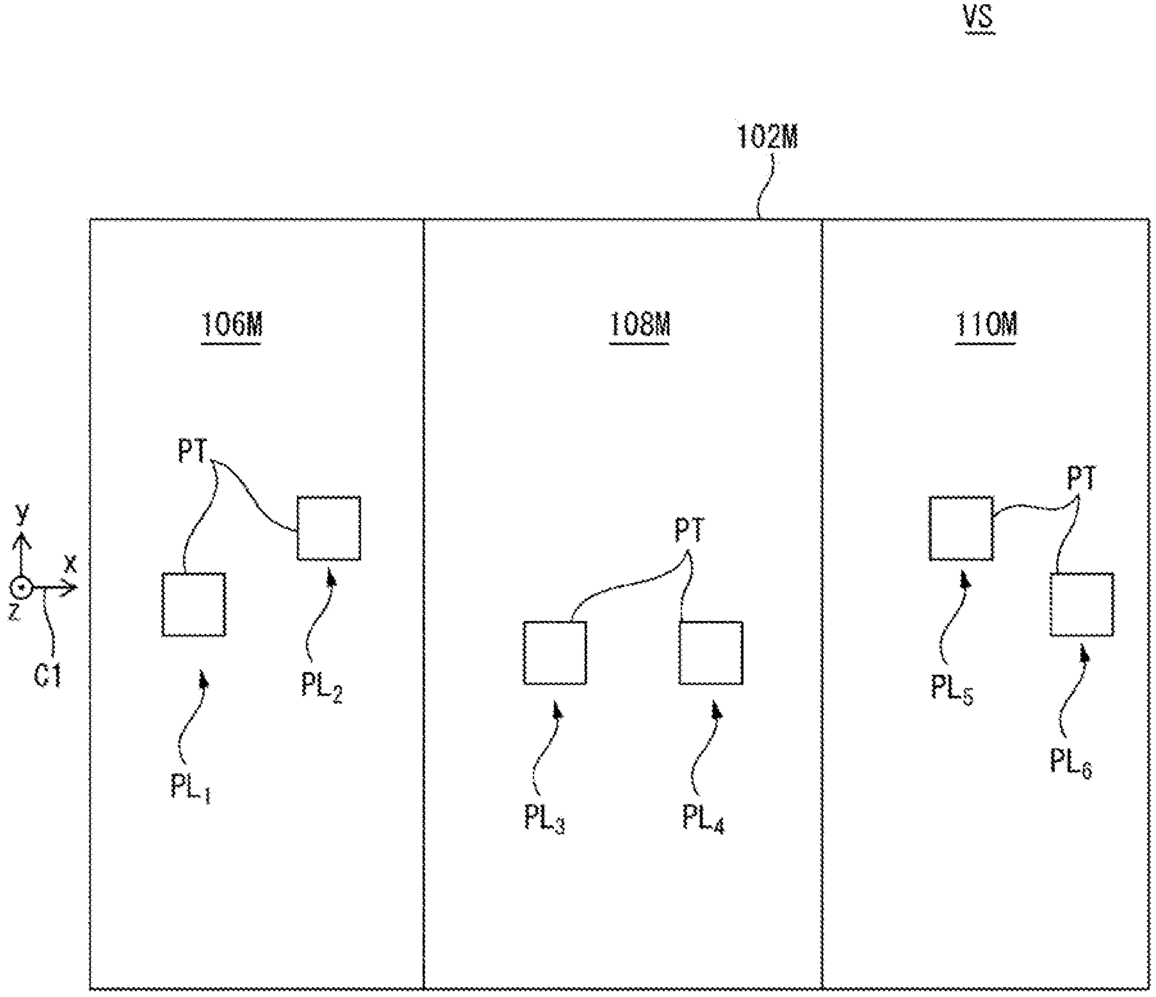
FIG. 6 illustrates an example of a process location set in a workpiece model.

The processor 52 acquires position data $PD_n$ of a process location $PL_n$ to be set in the workpiece model 102M. FIG. 6 illustrates an example of the process location $PL_n$. In the example illustrated in FIG. 6, process locations $PL_1$ and $PL_2$ are set on the surface model 106M of the workpiece model 102M, process locations $PL_3$ and $PL_4$ are set on the surface model 108M, and process locations $PL_5$ and $PL_6$ are set on the surface model 110M.

Figure 7:
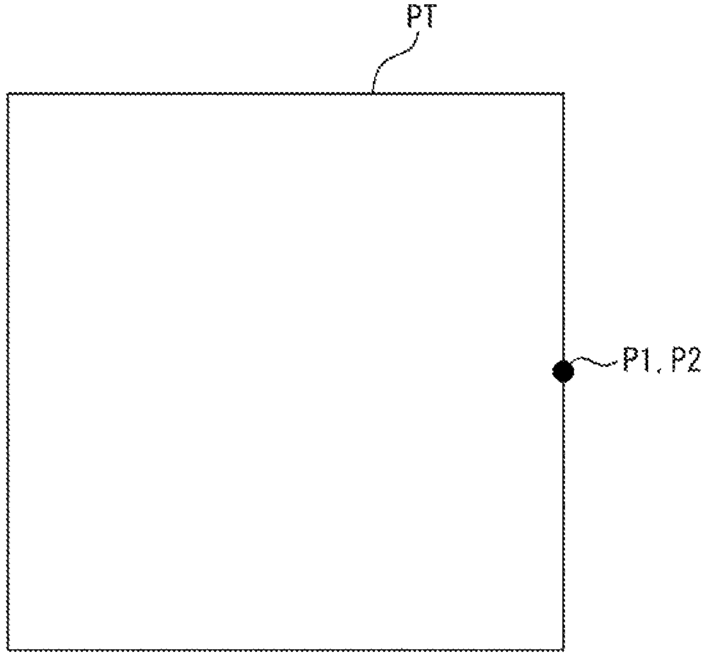
FIG. 7 illustrates an example of a process path set in the process location illustrated in FIG. 6.

A process path PT having a predetermined shape is set in each of the plurality of process locations $PL_n$ (n=1 to 6). FIG. 7 illustrates an example of the process path PT. In the example illustrated in FIG. 7, the process path PT is a quadrilateral and has a start point P1 and an end point P2. In the actual laser process operation LPO, the laser processing machine 12 performs laser process on the process location $PL_n$ by moving the laser beam LB radiated from the laser irradiation device 18 in a clockwise direction (or an anti-clockwise direction) along the process path PT from the start point P1 to the end point P2. In the present description, moving the laser beam LB only once from the start point P1 to the end point P2 of the process path PT is referred to as "laser scanning" once.

As an example, the operator operates the input device 60 to set the process location $PL_n$ (specifically, the process path PT) in the moving mechanism coordinate system C1 as data in a form (e.g., another format) different from the drawing data of the workpiece model 102M, thereby creating the position data $PD_n$ of the process location $PL_n$.

Alternatively, the operator may create the workpiece model 102M using a design support device (CAD/CAM device) that is a computer different from the teaching device 50, and set the process location $PL_n$ in the workpiece model 102M, thereby creating the position data $PD_n$ of the process location $PL_n$ as data of the same form (or another form) as the workpiece model 102M. The processor 52 acquires, as coordinates in the moving mechanism coordinate system C1, the position data $PD_n$ of each process location $PL_n$ (process path PT) set in the moving mechanism coordinate system C1.

Next, the processor 52 receives an input of an operation parameter PRv for executing a virtual laser process operation VLP (i.e., simulation of the laser process operation LPO) in which the virtual laser beam LBv is simulatively irradiated onto the process location $PL_n$ set in the workpiece model 102M in the virtual space VS.

The operation parameter PRv includes at least one of, for example, the number of times $N_v$ of laser scanning of the process path PT set in each process location $PL_n$ in the virtual laser process operation VLP, a time $t_v$ of laser scanning once the process path PT, a scanning frequency $f_v$ (i.e., the number of times of laser scanning of the process path PT in one second), a scan speed $V_v$ of moving the virtual laser beam LBv along the process path PT, an order $OR_v$ of laser scanning of the plurality of process locations $PL_n$, and a movement speed $U_v$ at which the moving mechanism model 20M moves the laser irradiation device model 18M.

For example, the processor 52 generates input image data ID1 for inputting the operation parameter PRv, and displays it on the display device 62. The operator operates the input device 60 to input the operation parameter PRv (i.e., the number of times $N_v$, the time $t_v$, the scanning frequency $f_v$, the scan speed $V_v$, the order $OR_v$, or the movement speed $U_v$) while visually recognizing the input image data ID1 displayed on the display device 62.

Then, based on the object model 100M (specifically, the workpiece model 102M and the environmental object model 104M) arranged in the virtual space VS, the laser processing machine model 12M (e.g., the laser irradiation device model 18M and the moving mechanism model 20M), the above-described position data $PD_n$, and the operation parameter PRv, the processor 52 simulatively operates the laser processing machine model 12M in the virtual space VS to generate the virtual laser process operation VLP of irradiating the process location $PL_n$ with a virtual laser beam LBv.

Assume that, for example, the processor 52 receives, as the operation parameter PRv, inputs of the number of times $N_v$=10, the scan speed $V_v$=100 [mm/sec], and the order $OR_v$ of the process locations $PL_1 \rightarrow PL_2 \rightarrow PL_3 \rightarrow PL_4 \rightarrow PL_5 \rightarrow PL_6$ for each process location $PL_n$. In this case, the processor 52 generates the virtual laser process operation VLP so as to simulatively perform the following series of operations in the virtual space VS.

Specifically, the processor 52 simulatively operates the moving mechanism model 20M in the virtual space VS to move the laser irradiation device model 18M rightward along a predetermined moving path MPv in the moving mechanism coordinate system C1, and simulatively operates the laser irradiation device model 18M to simulatively emit the virtual laser beam LBv from the laser irradiation device model 18M in the order $OR_v$ of the process locations $PL_1 \rightarrow PL_2 \rightarrow PL_3 \rightarrow PL_4 \rightarrow PL_5 \rightarrow PL_6$.

At this time, the processor 52 moves the virtual laser beam LBv from the laser irradiation device model 18M along the process path PT at the scan speed $V_v$=100 [mm/ sec] at each process location $PL_n$, and performs the laser scanning the number of times $N_v$=10 on each process location $PL_n$.

The processor 52 automatically generates the virtual laser process operation VLP including such a series of operations based on the object model 100M, the laser processing machine model 12M, the position data $PD_n$, and the operation parameter PRv. More specifically, the processor 52 automatically determines the moving path MPv.

Note that the moving path MPv is defined by a plurality of teaching points $TP_1$, $TP_2$, . . . , $TP_m$ (m is a positive integer), and the processor 52 may determine the moving path MPv by automatically determining the teaching point $TP_m$. The moving path MPv (or, the teaching point $TP_m$) is determined as coordinates of the moving mechanism coordinate system C1.

The processor 52 automatically determines radiation timing RTv (e.g., irradiation start time and irradiation end time) at which each process location $PL_n$ is irradiated with the virtual laser beam LBv in the virtual laser process operation VLP and the direction (or, irradiation position on the workpiece model 102M) in which the virtual laser beam LBv is emitted from the laser irradiation device model 18M at the radiation timing RTv.

As described above, in the present embodiment, the processor 52 functions as an operation generating unit 66 (FIG. 2) configured to generate the virtual laser process operation VLP. Note that the processor 52 may cause the display device 62 to display, as image data of a video, the generated virtual laser process operation VLP. In this case, the operator can visually recognize the virtual laser process operation VLP as a simulation video.

The processor 52 receives an input of an interference detection condition $CD_n$ for detecting interference between the virtual laser beam LBv and the object model 100M in the virtual laser process operation VLP. The interference detection condition $CD_n$ includes, for example, a beam size $BS_n$ of the virtual laser beam LBv or an invalid area $IA_n$ to be set with respect to the object model 100M to invalidate the detection of interference.

Figure 8:
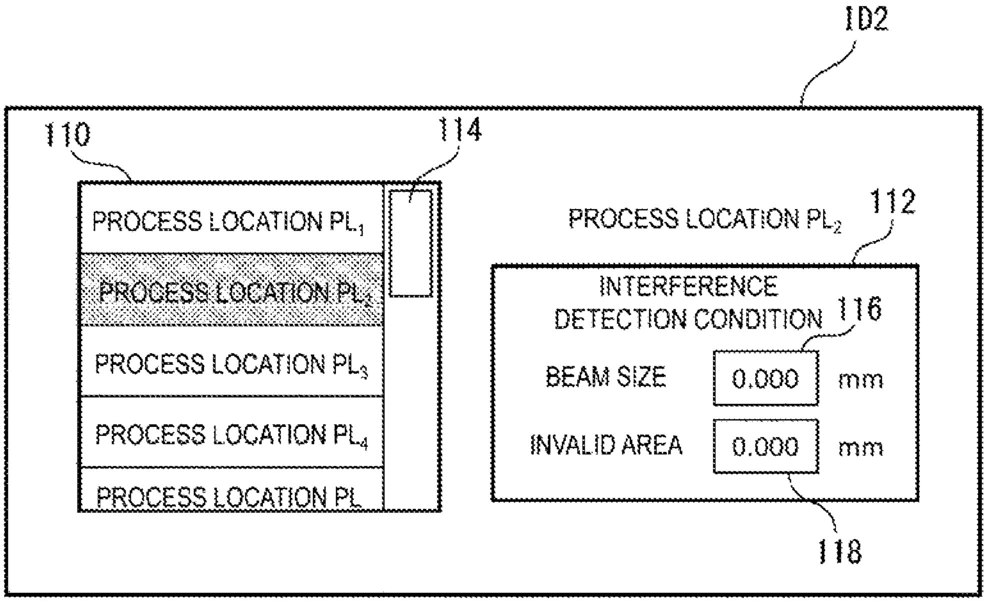
FIG. 8 illustrates an example of input image data for inputting an interference detection condition.

The processor 52 generates and displays, on the display device 62, input image data ID2 for inputting the interference detection condition $CD_n$. As described above, in the present embodiment, the processor 52 functions as an image generating unit 68 (FIG. 2) configured to generate the input image data ID2. FIG. 8 illustrates an example of the input image data ID2.

The input image data ID2 is a graphical user interface (GUI) for enabling the operator to input the interference detection condition $CD_n$, and includes a process location selection image area 110 and a condition setting image area 112. In the process location selection image area 110, the process locations $PL_n$ (n=1 to 6) for which the processor 52 has acquired the position data $PD_n$ are enumerated in a list format.

The process location selection image area 110 displays a scroll bar image 114, and the operator can change the process location $PL_n$ to display by operating the input device 60 to slide the scroll bar image 114 up and down on the image. The operator operates the input device 60 to select one of the plurality of process locations $PL_n$ displayed in the process location selection image area 110 by clicking it on the image. Note that the example illustrated in FIG. 8 illustrates a state in which the process location $PL_2$ is selected.

The condition setting image area 112 is for setting the interference detection condition $CD_n$ (specifically, the beam size $BS_n$ and the invalid area $IA_n$) for the process location $PL_n$ selected in the process location selection image area 110. Specifically, the condition setting image area 112 includes a numerical value input image 116 for setting the beam size $BS_n$ and a numerical value input image 118 for setting the invalid area $IA_n$.

The numerical value input image 116 is for inputting the beam size $BS_n$ of the virtual laser beam LBv with which the process path PT of the process location $PL_n$ (the process location $PL_2$ in the example illustrated in FIG. 8) selected in the process location selection image area 110 is irradiated. The beam size $BS_n$ can be expressed as, for example, a diameter (or radius) $R_n$ (unit: [mm]) or a cross-sectional area En (unit: [$mm^2$]) of the virtual laser beam LBv. FIG. 8 illustrates an example in which the diameter $R_n$ [mm] is input as the beam size $BS_n$ to the numerical value input image 116.

The operator can operate the input device 60 to input the beam size $BS_n$ to the numerical value input image 116. For example, in a case where a diameter $R_2$=0.400 [mm] is input as a beam size $BS_2$ to the numerical value input image 116 when the process location $PL_2$ is selected as illustrated in FIG. 8, when executing the virtual laser process operation VLP, the processor 52 simulatively irradiates the process location $PL_2$ with the virtual laser beam LBv having a columnar shape with the diameter $R_2$=0.400 [mm], and performs laser scanning on the process path PT.

On the other hand, the numerical value input image 118 is for inputting a distance $d_n$ (unit: [mm]) from the irradiation position on the workpiece model 102M in order to set an area within a range of the distance $d_n$ as the invalid area $IA_n$ when simulatively irradiating the process location $PL_n$ selected in the process location selection image area 110 with the virtual laser beam LBv. The operator can operate the input device 60 to input the distance $d_n$ defining the invalid area $IA_n$ to the numerical value input image 118.

For example, in a case where the distance $d_2$=1.000 [mm] is input to the numerical value input image 118 when the process location $PL_2$ is selected as illustrated in FIG. 8, the processor 52 sets, as an invalid area $IA_2$, a range of the distance $d_2$=1.000 [mm] from the irradiation position on the surface model 106M in which the process location $PL_2$ is set, in a propagation area of the virtual laser beam LBv with which the process location $PL_2$ is irradiated by the virtual laser process operation VLP. Note that the processor 52 may set the invalid area $IA_2$ as a hemispherical area (i.e., a hemispherical area having a radius $d_2$ centered on the irradiation position) within the distance $d_2$=1.000 [mm] from the irradiation position on the surface model 106M.

Here, depending on the form of the drawing data of the object model 100M, there is a case in which the processor 52 cannot distinguish the workpiece model 102M from the environmental object model 104M. In this case, when recognizing the workpiece model 102M and the environmental object model 104M as one object model 100M and executing the virtual laser process operation VLP, the processor 52 cannot distinguish whether the virtual laser beam LBv interferes with the workpiece model 102M or interferes with the environmental object model 104M.

In such a case, when laser scanning is performed on the process location $PL_n$ with the virtual laser beam LBv in the virtual laser process operation VLP, the virtual laser beam LBv and the workpiece model 102M interfere with each other in terms of calculation, and the processor 52 detects such interference. According to the present embodiment, by setting the invalid area $IA_n$ with respect to the workpiece model 102M as described above, it is possible to invalidate and not to detect the interference between the virtual laser beam LBv and the workpiece model 102M.

As described above, the processor 52 receives the input of the interference detection condition $CD_n$ (specifically, the beam size $BS_n$ and the distance $d_n$ defining the invalid area $IA_n$) for each of the plurality of process locations $PL_n$ through the input image data ID2. Therefore, in the present embodiment, the processor 52 functions as an input receiving unit 70 (FIG. 2) configured to receive the input of the interference detection condition $CD_n$.

Thereafter, the operator operates the input device 60 to input a command CM1 for starting the virtual laser process operation VLP. For example, the processor 52 may generate start button image data (not illustrated) for starting the virtual laser process operation VLP and display it on the display device 62. Upon receiving the command CM1 through the input device 60, the processor 52 executes the virtual laser process operation VLP described above in the virtual space VS.

During the execution of this virtual laser process operation VLP, the processor 52 detects the interference between the virtual laser beam LBv and the object model 100M based on the interference detection condition $CD_n$ with which the input has been received through the input image data ID2. Specifically, in the virtual laser process operation VLP, the processor 52 calculates the propagation area of the virtual laser beam LBv when the process location $PL_n$ is simulatively irradiated with the virtual laser beam LBv having the beam size $BS_n$ set as the interference detection condition $CD_n$, and detects the presence or absence of the interference between the virtual laser beam LBv and the object model 100M.

At this time, since the invalid area $IA_n$ has been set with respect to the process location $PL_n$ as the interference detection condition $CD_n$, the processor 52 does not detect the interference between the virtual laser beam LBv and the workpiece model 102M, but detects the interference between the virtual laser beam LBv and the environmental object model 104M. As described above, in the present embodiment, the processor 52 functions as an interference detecting unit 72 (FIG. 2) configured to detect interference between the virtual laser beam LBv and the object model 100M based on the interference detection condition $CD_n$.

Upon detecting the interference between the virtual laser beam LBv and the environmental object model 104M in the virtual laser process operation VLP, the processor 52 generates a notification signal NS for notifying that. This notification signal NS includes, for example, information (e.g., image data for highlighting the interference position on the environmental object model 104M) indicating a position at which the virtual laser beam LBv interferes with the environmental object model 104M.

Upon recognizing, by the notification signal NS, that the interference between the virtual laser beam LBv and the environmental object model 104M has occurred, the operator corrects the virtual laser process operation VLP generated by the operation generating unit 66. Specifically, the operator operates the input device 60 to input a command CM2 for changing a parameter such as the moving path MPv (or, the teaching point $TP_m$), the movement speed $U_v$, or the radiation timing RTv described above. In response to the command CM2, the processor 52 functions as the operation generating unit 66, and corrects the virtual laser process operation VLP by changing a parameter such as the moving path MPv (or, the teaching point $TP_m$) having been set, the movement speed $U_v$, or the radiation timing RTv.

In this manner, the operator tries the virtual laser process operation VLP, and when the interference between the virtual laser beam LBv and the environmental object model 104M occurs in the virtual laser process operation VLP having been tried, the operator repeats the work of correcting the virtual laser process operation VLP. As a result, the processor 52 (the operation generating unit 66) can generate a virtual laser process operation $VLP_0$ in which the interference between the virtual laser beam LBv and the environmental object model 104M does not occur.

Next, the operator operates the input device 60 to input a command CM3 for generating a process program PPG for the laser process operation LPO executed by the laser processing machine 12 in the real space. At this time, the processor 52 may generate button image data (not illustrated) for generating the process program PPG and display it on the display device 62.

Upon receiving the command CM3 through the input device 60, the processor 52 generates the process program PPG based on the virtual laser process operation $VLP_0$ generated as described above. Specifically, the processor 52 automatically generates the process program PPG in which the position data $PD_n$ of the process location $PL_n$, the moving path MPv (or, the teaching point $TP_m$), the radiation timing RTv, and the operation parameter PRv (the number of times of scanning $N_v$, a scan time $t_v$, the scanning frequency $f_r$, the scan speed $V_v$, the order $OR_v$, or the movement speed $U_v$), which define the operation of the virtual laser process operation $VLP_0$, are defined as a command CMv (e.g., a code). As described above, in the present embodiment, the processor 52 functions as a program generating unit 74 (FIG. 2) configured to generate the process program PPG.

As described above, in the present embodiment, the input receiving unit 70 receives the input of the beam size $BS_n$ and the invalid area $IA_n$ as the interference detection condition $CD_n$, and the interference detecting unit 72 detects the interference generated in the virtual laser process operation VLP based on the received interference detection condition $CD_n$.

Herein, in a known manner, the virtual laser process operation VLP is executed with the virtual laser beam LBv defined as a line having a cross-sectional area of zero, and the presence or absence of the interference between the virtual laser beam LBv and the object model 100M is detected. In this case, an error cannot exist in the interference detection between the virtual laser beam LBv and the object model 100M.

When the laser process operation is executed in accordance with the process program created as a result of the virtual laser process operation VLP based on such interference detection, if there is a slight error in the radiation timing of the laser processing machine 12, the position of the process location $PL_n$, or the arrangement of the workpiece 102 and the environmental object 104, there is a possibility that the actual laser beam LB interferes with the environmental object 104.

In the present embodiment, when the input of the beam size $BS_n$ is received as the interference detection condition $CD_n$, the virtual laser process operation VLP is executed with the virtual laser beam LBv defined as an area having a cross-sectional area corresponding to the beam size $BS_n$, and the interference between the virtual laser beam LBv and the object model 100M is detected.

According to this configuration, even if there is a slight error in the radiation timing of the laser processing machine 12, the position of the process location $PL_n$, the arrangement of the workpiece 102 and the environmental object 104, or the like, the laser beam LB can be prevented from interfering with the environmental object 104 in the actual laser process operation LPO.

As described above, there has been a known case in which the workpiece model 102M and the environmental object model 104M cannot be distinguished from each other depending on the form of the drawing data of the object model 100M. In the present embodiment, when the input of the invalid area $IA_n$ is received as the interference detection condition $CD_n$, it is possible to avoid the interference between the virtual laser beam LBv and the workpiece model 102M from being detected in the virtual laser process operation VLP. As described above, by receiving the beam size $BS_n$ or the invalid area $IA_n$ as the interference detection condition $CD_n$, it is possible to effectively validate the interference that can occur.

In the present embodiment, the input receiving unit 70 receives an input of the distance $d_n$ as the interference detection condition $CD_n$ for setting the invalid area $IA_n$. According to this configuration, the operator can easily set the invalid area $IA_n$ as an area having a desired size, and can intuitively recognize the range of the invalid area $IA_n$ in the virtual space VS.

In the present embodiment, the input receiving unit 70 receives the input of the interference detection condition $CD_n$ for each of the plurality of process locations $PL_n$. According to this configuration, the operator can set the interference detection condition $CD_n$ in detail for each process location $PL_n$. For example, in the virtual laser process operation VLP, there is a case where the laser irradiation device model 18M is moved at a relatively high movement speed $U_{v1}$ when laser scanning is performed on the process locations $PL_1$ and $PL_2$, and the laser irradiation device model 18M is moved at a relatively low movement speed $U_{v2}$ ($<U_{v1}$) when laser scanning is performed on the process locations $PL_3$ and $PL_4$.

Here, when the laser irradiation device model 18M is moved at the lower movement speed $U_{v2}$, a deviation between the result of interference detection between the virtual laser beam LBv and the object model 100M (specifically, the environmental object model 104M) and the interference state between the laser beam LB and the object 100 (specifically, the environmental object 104) in the actual laser process operation LPO is unlikely to occur, and therefore, it may be desirable to set a small clearance for interference detection in the virtual laser process operation VLP.

On the other hand, when the laser irradiation device model 18M is moved at the faster movement speed $U_{v1}$, a deviation between the result of interference detection between the virtual laser beam LBv and the object model 100M and the interference state between the laser beam LB and the object 100 in the actual laser process operation LPO is likely to occur, and therefore, it may be desirable to set a large clearance for interference detection in the virtual laser process operation VLP.

According to the present embodiment, the relatively large beam sizes $BS_1$ and $BS_2$ are set with respect to the process locations $PL_1$ and $PL_2$ in which the laser irradiation device model 18M is moved at the high movement speed $U_{v1}$ to perform laser scanning, and the relatively small beam sizes $BS_3$ and $BS_4$ can be set with respect to the process locations $PL_3$ and $PL_4$ in which the laser irradiation device model 18M is moved at the low movement speed $U_{v1}$ to perform laser scanning. This enables the operator to set the optimum beam size $BS_n$ for each process location $PL_n$.

There is a case in which the operator desires to adjust the range of the invalid area $IA_n$ to be set in the workpiece model 102M in response to the positional relationship between the workpiece model 102M and the environmental object model 104M. According to the present embodiment, the range of the invalid area $IA_n$ can be appropriately set for each process location $PL_n$. As described above, by receiving the input of the interference detection condition $CD_n$ for each process location $PL_n$, it is possible to optimize the interference detection condition $CD_n$ for each process location $PL_n$.

In the present embodiment, the image generating unit 68 generates the input image data ID2 (FIG. 8) for inputting the interference detection condition $CD_n$. According to this configuration, since the operator can input the interference detection condition $CD_n$ while visually recognizing the input image data ID2, the work of setting the interference detection condition $CD_n$ can be simplified.

In the present embodiment, the operation generating unit 66 generates the virtual laser process operation VLP based on the object model 100M, the laser processing machine model 12M, and the position data $PD_n$ of the process location $PL_n$. According to this configuration, it is possible to cause the processor 52 to automatically generate the virtual laser process operation VLP, and the operator can verify and validate the virtual laser process operation VLP. This can simplify the work related to teaching of the laser process operation LPO.

In the present embodiment, the program generating unit 74 generates the process program PPG for the laser process operation LPO based on the virtual laser process operation $VLP_0$ generated by the operation generating unit 66. According to this configuration, since it is possible to automatically generate the virtual laser process operation $VLP_0$ and the process program PPG, it is possible to further simplify the operation related to teaching of the laser process operation LPO.

The processor 52 may automatically set the beam size $BS_n$ in response to the movement speed $U_v$ at which the moving mechanism model 20M moves the laser irradiation device model 18M. In this case, a data table in which the movement speed $U_v$ and the beam size $BS_n$ are stored in association with each other is stored in advance in the memory 54, and the processor 52 may set the beam size $BS_n$ by applying, to the data table, the movement speed $U_v$ received as the operation parameter PRv. In this case, the input receiving unit 70 may receive only the input of the invalid area $IA_n$ without receiving the input of the beam size $BS_n$.

For example, when the workpiece model 102M and the environmental object model 104M can be distinguished by the form of the drawing data of the object model 100M, the interference detecting unit 72 can be configured to invalidate the interference between the virtual laser beam LBv and the workpiece model 102M and detect only the interference between the virtual laser beam LBv and the environmental object model 104M. In this case, the input receiving unit 70 may receive only the input of the beam size $BS_n$ without receiving the input of the invalid area $IA_n$.

In the virtual laser process operation VLP, the processor 52 may emit, from the laser irradiation device model 18M, the virtual laser beam LBv having a conical shape whose cross-sectional area decreases from the laser irradiation device model 18M toward the process location $PL_n$. In this case, the input receiving unit 70 may further receive, as the interference detection condition $CD_n$, an input of a reduction ratio In (or, a taper rate) at which the cross-sectional area decreases, in addition to the beam size $BS_n$.

Assume that, for example, the input receiving unit 70 receives an input of beam size $BS_2$=diameter $R_2$=0.400 [mm] and a reduction ratio λ as the interference detection condition $CD_2$ related to the process location $PL_2$. In this case, in the virtual laser process operation VLP, the processor 52 simulatively emits the virtual laser beam LBv having a conical shape in which the diameter $R_2$ in a laser beam emitting part model 40M of the laser irradiation device model 18M is 0.400 [mm], and the cross-sectional area decreases at a reduction ratio $\lambda_2$ from the laser beam emitting part model 40M toward the process location $PL_2$.

Alternatively, in the virtual laser process operation VLP, the processor 52 simulatively emits the virtual laser beam LBv having a conical shape in which the cross-sectional area decreases at a reduction ratio $\lambda_2$ from the laser beam emitting part model 40M toward the position of the process location $PL_2$ and the diameter $R_2$ becomes 0.400 [mm] at the position of the process location $PL_2$. By generating such the virtual laser beam LBv having a conical shape, it is possible to execute the virtual laser process operation VLP with the virtual laser beam LBv similar to the laser beam LB in the actual laser process operation LPO.

Note that the input receiving unit 70 may receive, as the interference detection condition $CD_n$ for the invalid area $IA_n$, an input that designates the surface models 106M, 108M, and 110M that are references when the invalid area $IA_n$ is set together with the above-described distance $d_n$. Assume that, for example, when selecting the process location $PL_2$ as illustrated in FIG. 8, the operator operates the input device 60 to designate the surface model 106M in which the process location $PL_2$ is set.

In this case, the processor 52 functions as the input receiving unit 70, receives the input that designates the surface model 106M as a reference of the invalid area $IA_2$, and sets, as the invalid area $IA_2$, a range of the input distance $d_2$ (e.g., 1.000 [mm]) from the irradiation position on the surface model 106M.

At this time, the processor 52 may function as the image generating unit 68 and display an image of the workpiece model 102M in the input image data ID2 so that the operator can visually recognize it. Note that the distance $d_n$ may be stored in advance in the memory 54 as a predetermined set value (e.g., $d_n$=1.000 [mm]). In this case, the processor 52 sets the invalid area $IA_n$ without receiving the input of the distance $d_n$.

In the present embodiment, the case in which the operation generating unit 66 automatically generates the virtual laser process operation VLP has been described. However, no such limitation is intended, and the operator may manually generate the virtual laser process operation VLP by operating the input device 60. In this case, the operation generating unit 66 can be omitted from the teaching device 50.

In the present embodiment, the case in which the program generating unit 74 automatically generates the process program PPG has been described. However, no such limitation is intended, and the operator may manually generate the process program PPG by operating the input device 60. In this case, the program generating unit 74 can be omitted from the teaching device 50.

In the present embodiment, the case in which the operator inputs the command CM2 for changing the moving path MPv (the teaching point $TP_m$), the movement speed $U_v$, or the radiation timing RTv when the interference between the virtual laser beam LBv and the environmental object model 104M occurs in the virtual laser process operation VLP has been described.

However, no such limitation is intended, and the processor 52 may function as the operation generating unit 66 to automatically correct the virtual laser process operation VLP by automatically changing the moving path MPv (the teaching point $TP_m$), the movement speed $U_v$, or the radiation timing RTv so as to avoid the interference based on the position of the generated interference.

The process program PPG described above may include a first process program PPG1 for operating the moving mechanism 20 and a second process program PPG2 for operating the laser irradiation device 18. In this case, the program generating unit 74 may generate the first process program PPG1 and the second process program PPG2 as separate data (e.g., in different data forms or formats).

Note that the model data acquisition unit 64, the operation generating unit 66, the image generating unit 68, the input receiving unit 70, the interference detecting unit 72, and the program generating unit 74 described above are functional modules realized by a computer program executed by the processor 52, for example. At least one function of the model data acquisition unit 64, the operation generating unit 66, the image generating unit 68, the input receiving unit 70, the interference detecting unit 72, and the program generating unit 74 may be implemented in the controller 14. In this case, the processor of the controller 14 has the function of the teaching device 50.

Next, other functions of the laser processing system 10 will be described with reference to FIG. 9. In a work cell in the real space, the controller 14 generates a command to the laser processing machine 12 of an actual machine in accordance with the process program PPG generated by the method (or another method) of the embodiment illustrated in FIG. 2, and causes the laser processing machine 12 to execute the laser process operation LPO.

In this laser process operation LPO, the laser processing machine 12 operates the moving mechanism 20 to move the laser irradiation device 18 rightward along the moving path MPv (i.e., the teaching points $TP_1$, $TP_2$, . . . , $TP_m$) and operates the laser irradiation device 18 to emit the laser beam LB, thereby performing laser scanning on the plurality of process locations $PL_n$ in the order $OR_v$.

Figure 10:
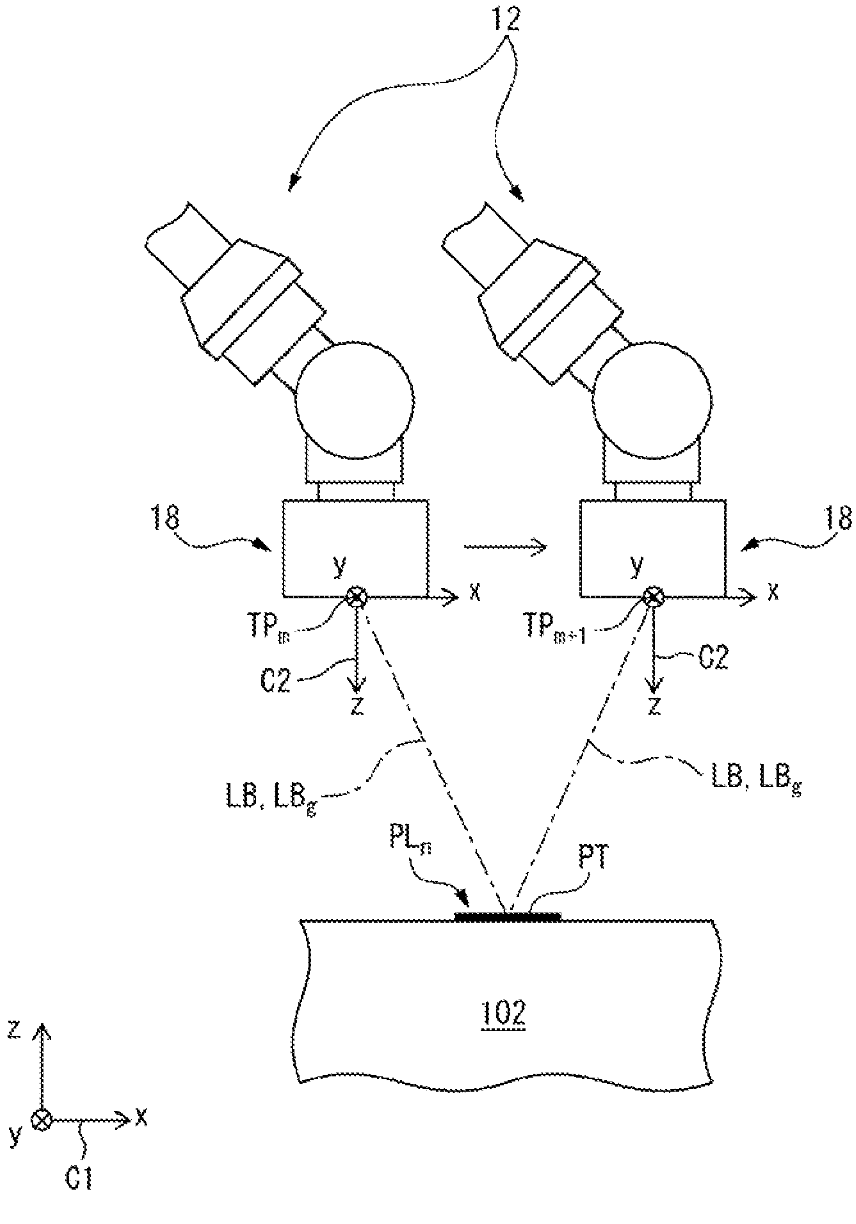
FIG. 10 illustrates an operation of the moving mechanism during laser scanning of one process location in the laser process operation.

FIG. 10 illustrates an operation of the moving mechanism 20 during laser scanning of one process location $PL_n$ with the laser beam LB in the laser process operation LPO. For example, when the number of times of scanning $N_v$=10 is defined in the process program PPG, while the moving mechanism 20 moves the laser irradiation device 18 rightward at the movement speed $U_v$ along the moving path MPv from the teaching point $TP_m$ (first teaching point) to the teaching point $TP_{m+1}$ (second teaching point), the laser irradiation device 18 performs laser scanning 10 times at the scan speed $V_v$ on the process path PT set at the process location $PL_n$ with the emitted laser beam LB.

During such the operation, interference between the laser beam LB and the environmental object 104 may occur in the real space, but since the movement speed $U_v$ of the moving mechanism 20 and the scan speed $V_v$ of the laser irradiation device 18 in the laser process operation LPO are high, it is difficult for the operator to visually verify the interference between the laser beam LB and the environmental object 104 during the actual laser process operation LPO.

Therefore, in the present embodiment, the teaching device 50 generates an interference verification program IPG for executing an interference verification operation IVO for preliminarily verifying the interference between the laser beam LB and the environmental object 104. Here, the interference verification operation IVO is an operation different from the actual laser process operation LPO, and is an operation of operating the laser processing machine 12 at an operation speed v lower than that of the laser process operation LPO to verify the interference and experimentally irradiating the process location $PL_n$ with a laser beam LBg having optical characteristics different from those of the laser process operation LPO.

The operation speed v of the laser processing machine 12 has a movement speed U at which the moving mechanism 20 moves the laser irradiation device 18 and a scan speed V at which the laser irradiation device 18 moves the laser beam LBg along the process path PL. The laser beam LBg is visible light (so-called guide laser) having a wavelength different from that of the laser beam LB emitted in the laser process operation LPO, and has laser power lower than that of the laser beam LB. In the present description, the laser beam LBg emitted in the interference verification operation IVO is referred to as guide laser LBg.

Hereinafter, a method of generating the interference verification program IPG will be described. When the operator operates the input device 60 to input a command CM4 for generating the interference verification program IPG, the processor 52 acquires the position data $PD_n$ of the process location $PL_n$. For example, the position data $PD_n$ may be stored in the memory 54 or may be defined in the process program PPG.

The processor 52 acquires the position data $PD_{TP}$ of the teaching points $TP_m$ and $TP_{m+1}$ from the process program PPG. As described above, in the present embodiment, the processor 52 functions as a position data acquisition unit 80 (FIG. 9) configured to acquire the position data $PD_{TP}$ of the teaching point $TP_m$ at which the laser processing machine 12 positions the laser irradiation device 18 in the laser process operation LPO.

Next, the processor 52 receives an input of an operation parameter $PRi_n$ for the interference verification operation IVO. The operation parameter $PRi_n$ includes, for example, a scan speed $V_{i\_n}$ for moving the guide laser LBg along the process path PL in the interference verification operation IVO, a scan time $t_n$ for moving the guide laser LBg from the start point P1 to the end point P2 of the process path PL, and an allowable time In of the scan time $t_n$.

Figure 11:
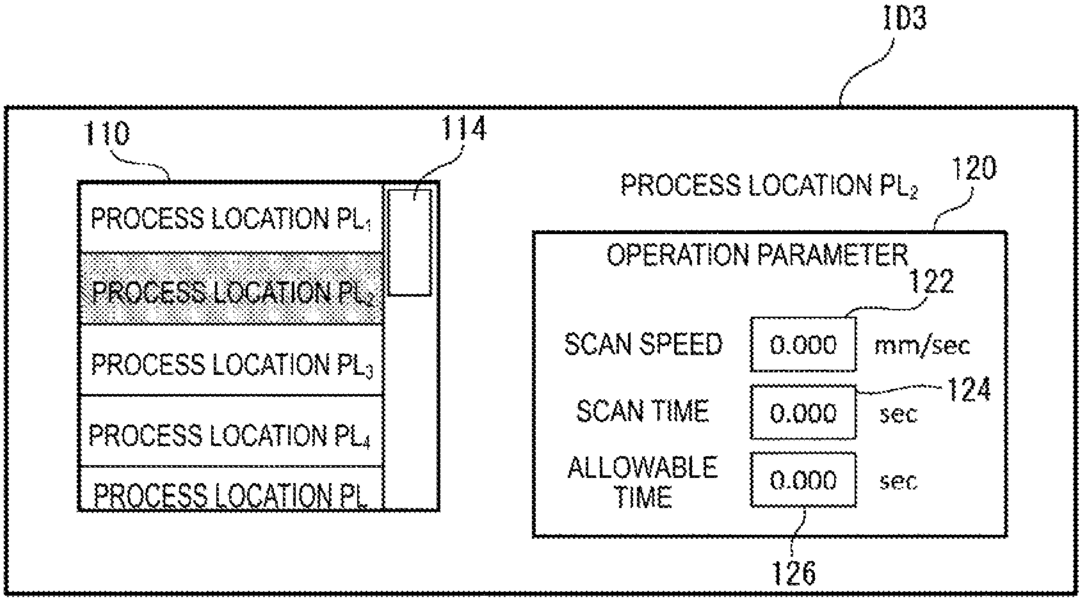
FIG. 11 illustrates an example of input image data for inputting an operation parameter of an interference verification operation.

The processor 52 generates input image data ID3 for inputting the operation parameter $PRi_n$, and displays it on the display device 62. As described above, in the present embodiment, the processor 52 functions as an image generating unit 82 (FIG. 9) configured to generate the input image data ID3. FIG. 11 illustrates an example of the input image data ID3.

The input image data ID3 is a GUI for enabling the operator to input the operation parameter $PRi_n$, and includes the process location selection image area 110 including the above-described scroll bar image 114 and a parameter setting image area 120. The parameter setting image area 120 is for setting the operation parameter $PRi_n$ for the process location $PL_n$ selected in the process location selection image area 110.

Specifically, the parameter setting image area 120 includes a numerical value input image 122 for setting the scan speed $V_{i\_n}$, a numerical value input image 124 for setting the scan time $t_n$, and a numerical value input image 126 for setting the allowable time In. The numerical value input images 122, 124, and 126 are for inputting the scan speed $V_{i\_n}$, the scan time $t_n$, and the allowable time In (a scan speed $V_{i\_2}$, scan time $t_2$, and allowable time $\tau_2$ in the example illustrated in FIG. 11) to the process location $PL_n$ (the process location $PL_2$ in the example illustrated in FIG. 11) selected in the process location selection image area 110.

As described above, the operator can select the process location $PL_n$ that is desired in the process location selection image area 110 and input the scan speed $V_{i\_n}$, the scan time $t_n$, and the allowable time $\tau_n$ as the operation parameters $PRi_n$ through the numerical value input images 122, 124, and 126 for each process location $PL_n$. Therefore, in the present embodiment, the processor 52 functions as an input receiving unit 84 (FIG. 9) configured to receive an input of the operation parameter $PRi_n$.

Next, the processor 52 determines an operation speed $v_n$ of the laser processing machine 12 in the interference verification operation IVO based on the received operation parameter $PRi_n$. Assume that, for example, the operator inputs, as operation parameters $PRi_2$, the scan speed $V_{i\_2}=1$ [mm/sec], the scan time $t_2=1$ [sec], and the allowable time $\tau_2=5$ [sec] in the parameter setting image area 120 when selecting the process location $PL_2$ in the process location selection image area 110 as illustrated in FIG. 11.

In this case, the processor 52 first acquires a path length $L_2$ from the start point P1 to the end point P2 of the process path PT set at the process location $PL_2$ from position data $PD_2$ of the process location $PL_2$. Then, scan speeds $V_{t2}$ and $V\tau_2$ corresponding to the scan time $t_2$ and the allowable time $\tau_2$ input as the operation parameters $PRi_2$ are obtained using the path length $L_2$.

Assume that, for example, the path length $L_2=40$ [mm]. In this case, regarding the scan time $t_2$, the processor 52 obtains, as $V_{t2}=L_2/t_2=40$ [mm/sec], the scan speed $V_{t2}$ when performing laser scanning on the path length $L_2$ at the scan time $t_2$. Similarly, regarding the allowable time $t_2$, the processor 52 obtains, as $V_{\tau 2}=L_2/\tau_2=8$ [mm/sec], the scan speed $V_{\tau 2}$ when performing laser scanning on the path length $L_2$ at the allowable time $\tau_2$.

Then, the processor 52 applies the scan speed $V_{i\_2}$ input as the operation parameter $PRi_2$ and the scan speed $V_{t2}$ and the scan speed $V_{\tau 2}$ obtained by calculation to a conditional expression (I) of MAX (MIN ($V_{i\_2}$, $V_{t2}$), $V_{t2}$). In this conditional expression (I), MIN ($V_{i\_2}$, $V_{t2}$) indicates selecting the smaller one of $V_{i\_2}$ and $V_{t2}$. That is, in the case of the present embodiment, MIN ($V_{i\_2}$, $V_2$)=$V_{i\_2}$ (=1 [mm/sec]), and hence MAX (MIN ($V_{i\_2}$, $V_{t2}$), $V_{\tau 2}$)=MAX ($V_{i\_2}$, $V_{\tau 2}$).

On the other hand, MAX ($V_{i\_2}$, $V_{\tau 2}$) indicates selecting the larger one of $V_{i\_2}$ and $V_{\tau 2}$. That is, in the case of the present embodiment, MAX ($V_{i\_2}$, $V_{\tau 2}$)=$V_{t2}$ (=8 [mm/sec]). Thus, the processor 52 determines, as $V_2=V_{\tau 2}=8$ [mm/sec], the scan speed $V_2$ when performing the laser scanning on the process location $PL_2$ in the interference verification operation IVO from the scan speed $V_{i\_2}$, the scan time $t_2$, and the allowable time $\tau_2$ input as the operation parameters $PRi_2$, and the conditional expression (I).

Technical significance of the use of the conditional expression (I) will be described below. Assume that the operator inputs the scan speed $V_{i\_2}$ as the operation parameter $PRi_2$, as a relatively low speed, from the viewpoint of making visual interference verification easy. In this case, a scan time $t_{V2}$ required for performing laser scanning on the path length $L_2$ at the scan speed $V_{i\_2}$ input is a relatively long scan time $t_v2=L_2/V_{i\_2}$.

On the other hand, assume that the operator inputs the scan time $t_2$ as the operation parameter $PRi_2$ in a relatively short time from the viewpoint of cycle time reduction of the interference verification operation IVO. In this case, the scan speed $V_{t2}$ corresponding to the scan time $t_2$ input becomes relatively high, and as a result, visual interference verification can become difficult. In the above-described conditional expression (I), by selecting the smaller one of the speed $V_{i\_2}$ and the speed $V_{t2}$ by MIN ($V_{i\_2}$, $V_{t2}$), the speed $V_{t2}$ at which visual interference verification can become difficult is excluded.

However, at the speed $V_{i\_2}$ selected by MIN ($V_{i\_2}$, $V_{t2}$), the scan time $t_{V2}$ becomes long as described above, and in this case, produces the possibility that the cycle time of the interference verification operation IVO excessively increases. Therefore, in the conditional expression (I), by selecting the larger one of the speed $V_{i\_2}$ and the speed $V_{\tau 2}$ corresponding to the allowable time $\tau_2$ by MAX ($V_{i\_2}$, $V_{\tau 2}$), the speed $V_{i\_2}$ at which the cycle time can be excessively redundant is excluded, and the speed $V_{t2}$ corresponding to the allowable time $\tau_2$ is set as the scan speed $V_2$ when performing the laser scanning on the process location $PL_2$ in the interference verification operation IVO.

As described above, in the present embodiment, the allowable time $t_2$ is input as the operation parameter $PRi_2$ in order to put the scan time $t_2$ required to perform laser scanning on the process path PT of the process location $PL_2$ in the interference verification operation IVO within an allowable range in which the cycle time of the interference verification operation IVO does not become excessively redundant, and according to the conditional expression (I), even if any of the speeds $V_{i\_2}$, $V_{t2}$, and $V_{\tau 2}$ is selected, the scan time $t_2$ does no longer exceed the allowable time $\tau_2$.

When the operator inputs the appropriate scan speed $V_{i\_2}$ or the scan time $t_2$ (e.g., inputs the scan speed $V_{i\_2}$=10 [mm/sec], the scan time $t_2$=5 [sec], and the allowable time $\tau_2$=10 [sec]), the processor 52 determines the scan speed $V_2$ when performing the laser scanning on the process location $PL_2$ in the interference verification operation IVO as the scan speed $V_{t2}$ (=8 [mm/sec]) corresponding to the scan time $t_2$ (=5 [sec]) from the conditional expression (I). The scan speed $V_2$ determined to enable visual interference verification as described above is set to a value lower than the scan speed $V_v$ (e.g., 100 [mm/sec]) in the laser process operation LPO.

As described above, based on the operation parameter $PRi_n$, the processor 52 determines, as a speed ($V_n<V_v$) lower than that of the laser process operation LPO, the operation speed $v_n$ (specifically, the scan speed $V_n$) when performing the laser scanning on the process location $PL_n$ in the interference verification operation IVO. Therefore, in the present embodiment, the processor 52 functions as an operation speed setting unit 86 (FIG. 9) configured to set the operation speed $v_n$.

When the operation speed $V_n$ determined based on the operation parameter $PRi_n$ is equal to or greater than a predetermined threshold $v_{th}$, the processor 52 may generate an alert signal AS "operation speed in the interference verification operation is high, so visual interference verification can be difficult" in a data form of image or voice, and output it through the display device 62 or a speaker (not illustrated). In this case, for example, the threshold $v_{th}$ may be determined in advance as $v_{th}=\alpha v_v$ ($\alpha$ is a positive coefficient) with reference to an operation speed $v_v$ (e.g., the scan speed $V_v$ or the movement speed $U_v$ defined in the process program PPG) of the laser process operation LPO.

Next, the processor 52 generates the interference verification program IPG defining a command CMi that causes the laser processing machine 12 to execute the following series of operations as the interference verification operation IVO. That is, in the interference verification operation IVO, while operating the laser oscillator 16 to generate the guide laser LBg and operating the moving mechanism 20 to move the laser irradiation device 18, the laser processing machine 12 operates the laser irradiation device 18 to perform laser scanning on the plurality of process locations $PL_n$ in the order $OR_v$ with the guide laser LBg.

When performing laser scanning on one process location $PL_n$, the laser processing machine 12 first operates the moving mechanism 20 to position the laser irradiation device 18 at the teaching point $TP_m$ (FIG. 10). Next, the laser processing machine 12 irradiates the process location $PL_n$ with the guide laser LBg in a state where the laser irradiation device 18 is kept still at the teaching point $TP_m$, and repeatedly performs laser scanning on the process path PT of the process location $PL_n$ at the scan speed $V_n$ determined by the operation speed setting unit 86.

Next, upon receiving an interference verification command CM5 from the operator, the laser processing machine 12 stops irradiation of the guide laser LBg, and then operates the moving mechanism 20 to position the laser irradiation device 18 at the teaching point $TP_{m+1}$. Next, the laser processing machine 12 irradiates the process location $PL_n$ with the guide laser LBg again in a state where the laser irradiation device 18 is kept still at the teaching point $TP_{m+1}$, and repeatedly performs laser scanning on the process path PT of the process location $PL_n$ at the scan speed $V_n$. Thus, the laser processing machine 12 executes laser scanning each time the laser irradiation device 18 is sequentially positioned at the teaching points $TP_m$ and $TP_{m+1}$.

Next, upon receiving an interference verification command CM6 from the operator, the laser processing machine 12 stops irradiation of the guide laser LBg, and then operates the moving mechanism 20 to move the laser irradiation device 18 to the teaching point $TP_m$ set at a next process location $PL_{n+1}$, and executes the above-described series of laser scanning on the next process location $PL_{n+1}$.

The laser processing machine 12 executes the interference verification operation IVO by repeatedly performing the series of laser scanning in the order $OR_v$ on the plurality of process locations $PL_n$. The processor 52 automatically generates the interference verification program IPG defining the command CMi for causing the laser processing machine 12 to execute the above-described series of interference verification operation IVO based on the position data $PD_n$ of the process location $PL_n$ and the position data $PD_{TP}$ of the teaching point $TP_m$ defined in the process program PPG, and the scan speed $V_n$ determined by the operation speed setting unit 86. As described above, in the present embodiment, the processor 52 functions as a program generating unit 88 (FIG. 9) configured to generate the interference verification program IPG.

Figure 12:
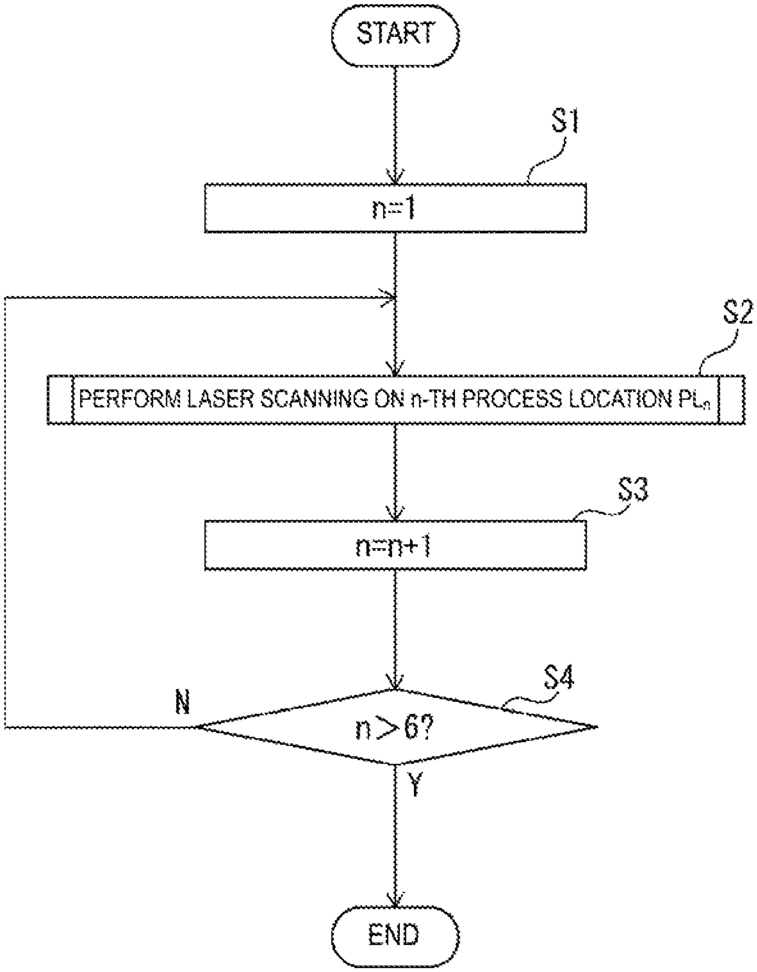
FIG. 12 is a flowchart showing an example of a flow of the interference verification operation.

FIG. 12 shows a flowchart showing an example of the interference verification operation IVO. The processor 52 of the teaching device 50 (or, the processor of the controller 14) executes the flow shown in FIG. 12 in accordance with the interference verification program IPG generated by the program generating unit 88. The flow shown in FIG. 12 is started when the processor 52 receives an operation start command CM7 from the operator, a higher-order controller, or a computer program (e.g., the interference verification program IPG).

In step S1, the processor 52 sets the number "n" for specifying the n-th process location $PL_n$ to "1". In step S2, the processor 52 performs laser scanning on the n-th process location $PL_n$. This step S2 will be described with reference to FIG. 13. After start of step S2, in step S11, the processor 52 operates the moving mechanism 20 to position the laser irradiation device 18 at the first teaching point $TP_m$ set at the n-th process location $PL_n$.

In step S12, the processor 52 starts laser scanning. Specifically, as described above, the processor 52 operates the laser oscillator 16 to generate the guide laser LBg, irradiates the nth process location $PL_n$ with the guide laser LBg in a state where the laser irradiation device 18 is kept still at the first teaching point $TP_m$, and repeatedly performs laser scanning on the process path PT of the nth process location $PL_n$ at the scan speed $V_n$ by the guide laser LBg.

The operator can visually verify the presence or absence of interference between the guide laser LBg and the environmental object 104 while the laser scanning is performed on the n-th process location $PL_n$ in this step S12. Upon completing the interference verification, the operator operates the input device 60 to input the interference verification command CM5.

In step S13, the processor 52 determines whether or not the interference verification command CM5 has been received. Upon determining to have received the interference verification command CM5 (i.e., YES), the processor 52 ends the laser scanning started in step S12 (i.e., stops the emission of the guide laser LBg), and proceeds to step S15, and on the other hand, upon determining NO, the processor 52 proceeds to step S14.

In step S14, the processor 52 generates a verification signal RS. For example, the processor 52 generates the verification signal RS of "Verify interference between the guide laser and the environmental object. Proceed to the next step if there is no interference." in a data form of image or voice. The processor 52 outputs the generated verification signal RS through the display device 62 or a speaker (not illustrated), and returns to step S13.

In this manner, the processor 52 loops steps S13 and S14 until determining YES in step S13. In step S15, the processor 52 operates the moving mechanism 20 to position the laser irradiation device 18 at the second teaching point $TP_{m+1}$ set at the n-th process location $PL_n$.

In step S16, the processor 52 starts laser scanning. Specifically, as described above, the processor 52 irradiates the n-th process location $PL_n$ with the guide laser LBg again in a state where the laser irradiation device 18 is kept still at the second teaching point $TP_{m+1}$, and repeatedly performs laser scanning on the process path PT of the n-th process location $PL_n$ at the scan speed $V_n$ by the guide laser LBg.

The operator visually verifies again the presence or absence of interference between the guide laser LBg and the environmental object 104 while the laser scanning is performed on the n-th process location $PL_n$ in this step S16. Upon completing the interference verification, the operator operates the input device 60 to input the interference verification command CM6.

In step S17, the processor 52 determines whether or not the interference verification command CM6 has been received. Upon determining YES, the processor 52 ends the laser scanning started in step S16, and proceeds to step S3 in FIG. 12, and on the other hand, upon determining NO, the processor 52 proceeds to step S18. In step S18, the processor 52 generates the verification signal RS similarly to step S14 described above, and returns to step S17. In this manner, the processor 52 loops steps S17 and S18 until determining YES in step S17.

With reference to FIG. 12 again, in step S3, the processor 52 increments the number "n" for specifying the n-th process location $PL_n$ by "1" (n=n+1). In step S4, the processor 52 determines whether or not the number "n" set at this point in time is greater than "6" (i.e., n>6).

Upon determining that n>6 (i.e., YES), the processor 52 ends the flow of the interference verification operation IVO shown in FIG. 12, and upon determining that n≤6 (i.e., NO), the processor 52 returns to step S2. Thus, the processor 52 repeatedly executes the loop of steps S2 to S4 until determining YES in step S4. The processor 52 executes steps S1 to S4 shown in FIG. 12 in accordance with the interference verification program IPG. Therefore, the interference verification program IPG defines the command CMi (e.g., code) for executing each of steps S1 to S4.

As described above, in the present embodiment, the processor 52 functions as the position data acquisition unit 80, the image generating unit 82, the input receiving unit 84, the operation speed setting unit 86, and the program generating unit 88, and generates the interference verification program IPG. Therefore, the position data acquisition unit 80, the image generating unit 82, the input receiving unit 84, the operation speed setting unit 86, and the program generating unit 88 constitute a device 90 (FIG. 9) configured to generate the interference verification program IPG. Note that the position data acquisition unit 80, the image generating unit 82, the input receiving unit 84, the operation speed setting unit 86, and the program generating unit 88 are functional modules realized by a computer program executed by the processor 52, for example.

In this device 90, the operation speed setting unit 86 sets the operation speed $v_n$ (the scan speed $V_n$) in the interference verification operation IVO to a speed lower than that in the laser process operation LPO based on the operation parameter $PRi_n$ received by the input receiving unit 84. Then, the program generating unit 88 generates the interference verification program IPG defining the command CMi for operating the laser processing machine 12 at the operation speed $v_n$ (the scan speed $V_n$) in the interference verification operation IVO and causing the process location $PL_n$ to be irradiated with the guide laser LBg (steps S12 and S16 in FIG. 13).

According to this device 90, in the interference verification operation IVO, by operating the laser processing machine 12 at the operation speed $v_n$ lower than that of the laser process operation LPO, the operator can visually verify the interference between the laser beam LBg and the environmental object 104 before performing the actual laser process operation LPO. As a result, the presence or absence of the interference can be effectively validated in advance, and when the interference occurs, measures such as correcting the process program PPG so as to avoid the interference can be taken.

In the device 90, the input receiving unit 84 receives inputs of the scan speed $V_{i\_n}$, the scan time $t_n$, and the allowable time $\tau_n$ as the operation parameters $PRi_n$, and the operation speed setting unit 86 determines the scan speed $V_n$ in the interference verification operation IVO based on the scan speed $V_{i\_n}$, the scan time $t_n$, and the allowable time $\tau_n$. According to this configuration, the scan speed $V_n$ in the interference verification operation IVO can be automatically determined as a speed at which the operator can perform visual interference verification.

In the device 90, the position data acquisition unit 80 acquires the position data $PD_{TP}$ of the teaching points $TP_m$ and $TP_{m+1}$ for positioning the laser irradiation device 18 in the laser process operation LPO, and the program generating unit 88 generates the interference verification program IPG defining the command CMi for positioning (steps S11 and S15 in FIG. 13) the laser irradiation device 18 to the teaching points $TP_m$ and $TP_{m+1}$ in the interference verification operation IVO.

According to this configuration, the interference verification operation IVO can be executed using the teaching points $TP_m$ and $TP_{m+1}$ in the laser process operation LPO (more specifically, defined in the process program PPG). Therefore, interference that can occur in the actual laser process operation LPO can be validated with high accuracy by the interference verification operation IVO performed in advance.

In the device 90, the program generating unit 88 generates the interference verification program IPG defining the command CMi for executing laser scanning (steps S11, S12, S15, and S16 in FIG. 13) each time the laser irradiation device 18 is sequentially positioned at the first teaching point $TP_m$ and the second teaching point $TP_m$ in the interference verification operation IVO.

According to this configuration, in the interference verification operation IVO, the laser scanning by the guide laser LBg is executed at the start point (the first teaching point $TP_m$) and the end point (the second teaching point $TP_{m+1}$) of the movement of the laser irradiation device 18 when performing the laser scanning on the process location $PL_n$ in the actual laser process operation LPO. This makes it possible to more efficiently validate interference that can occur when laser scanning is performed on the process location $PL_n$ in the actual laser process operation LPO.

In the device 90, the input receiving unit 84 receives the inputs of the operation parameters $PRi_n$ (the scan speed $V_{i\_2}$, the scan time $t_2$, allowable time $\tau_2$) for each of the plurality of process locations $PL_n$, and the operation speed setting unit 86 determines the operation speed $b_n$ (the scan speed $V_n$) in the interference verification operation IVO for each of the plurality of process locations $PL_n$.

According to this configuration, the operator can set the operation speed $v_n$ in the interference verification operation IVO in detail for each process location $PL_n$ in consideration of the positional relationship between the workpiece 102 and the environmental object 104. Therefore, it is possible to make visual interference verification in the interference verification operation IVO easy.

In the device 90, the image generating unit 82 generates the input image data ID3 for inputting the operation parameter $PRi_n$. According to this configuration, since the operator can input the operation parameter $PRi_n$ while visually recognizing the input image data ID3, the work of setting the operation parameter $PRi_n$ can be simplified.

In the present embodiment, the case in which the operation speed setting unit 86 sets the scan speed $V_n$ as the operation speed $v_n$ has been described. However, no such limitation is intended, and the operation speed setting unit 86 may set, as the operation speed $v_n$, the movement speed $U_n$ at which the moving mechanism 20 moves the laser irradiation device 18, instead of the scan speed $V_n$ (or, in addition to the scan speed $V_n$). In this case, the input receiving unit 84 may receive the input of the movement speed $U_n$ as the operation parameter $PRi_n$ for each of the plurality of process locations $PL_n$.

The input receiving unit 84 may receive a scanning frequency $f_{i\_n}$ ($=1/t_n$) as the operation parameter $PRi_n$ instead of (or, in addition to) the above-described scan time $t_n$. In this case, the operation speed setting unit 86 may determine the scan speed $V_n$ in the interference verification operation IVO by obtaining a scan speed $V_{fn}$ corresponding to the input scanning frequency $f_{i\_n}$ from an expression of $V_{fn}=f_{i\_n}\times L_n$ (where $L_n$ is the path length of the process path PT of the process location $PL_n$) and applying the scan speed Vin to the conditional expression (I) of MAX (MIN ($V_{i\_n}$, $V_{fn}$), $V_{\tau n}$).

The above-described conditional expression (I) is not limited to the logical expression of MAX (MIN ($V_{i\_n}$, $V_{tn}$), $V_{\tau n}$). The operator may use any logical expression as the conditional expression (I). For example, a logical expression of MIN (MAX ($V_{i\_n}$, $V_{tn}$), $V_{\tau n}$) may be used as the conditional expression (I).

In the present embodiment, the case in which the input receiving unit 70 receives the inputs of the scan speed $V_{i\_n}$, the scan time $t_n$, and the allowable time In as the operation parameters $PRi_n$ has been described. However, no such limitation is intended, and the input receiving unit 70 may receive only one (or two) of the scan speed $V_{i\_n}$, the scan time $t_n$, and the allowable time $\tau_n$. In this case, the operation speed setting unit 86 determines the operation speed $v_n$ based on the one (or the two).

In the present embodiment, the case in which the position data acquisition unit 80 acquires the position data $PD_{TP}$ of the teaching point $TP_m$, and the program generating unit 88 generates the interference verification program IPG defining the command CMi for positioning the laser irradiation device 18 at the teaching point $TP_m$ in the interference verification operation IVO has been described.

However, no such limitation is intended, and the program generating unit 88 may generate the interference verification program IPG defining the command CMi for positioning the laser irradiation device 18 at an arbitrary position in the interference verification operation IVO without using the position data $PD_{TP}$. The arbitrary position may be determined by the operator in response to the interference verification operation IVO to be executed. That is, in this case, the position data acquisition unit 80 can be omitted from the device 90.

Figure 13:
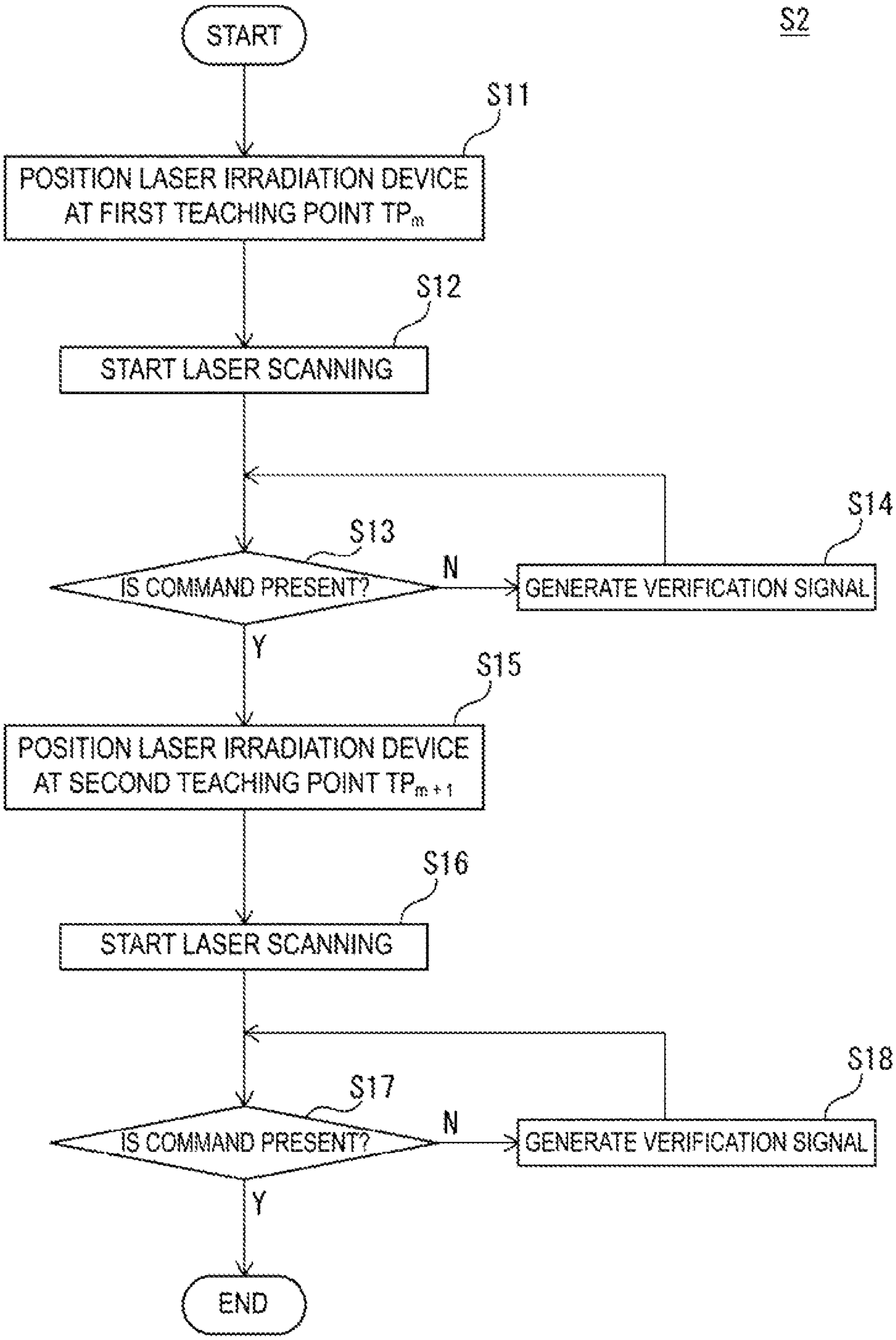
FIG. 13 is a flowchart showing an example of a flow of step S2 in FIG. 12.

In the present embodiment, the case in which the program generating unit 88 generates the interference verification program IPG so as to perform laser scanning in the state where the laser irradiation device 18 is kept still at the teaching points $TP_m$ and $TP_{m+1}$ in steps S12 and S16 in FIG. 13 has been described. However, no such limitation is intended, and the program generating unit 88 may generate the interference verification program IPG so as to execute laser scanning while the laser irradiation device 18 is passing through the teaching points $TP_m$ and $TP_{m+1}$ without stopping at the teaching points $TP_m$ and $TP_{m+1}$ in steps S12 and S16.

Steps S13, S14, S17, and S18 may be omitted from the flow of the interference verification operation IVO shown in FIG. 13. For example, in the interference verification operation IVO, after start of step S12, the processor 52 may repeatedly perform laser scanning on the nth process location $PL_n$ a predetermined number of times $N_i$, and then proceed to step S15.

After start of step S16, the processor 52 may repeatedly perform laser scanning on the n-th process location $PL_n$ the predetermined number of times $N_i$, and then end step S2. In this case, the input receiving unit 84 may further receive the input of the number of times $N_i$ for each process location $PL_n$ as the operation parameter $PRi_n$.

The functions of the device 90 (i.e., the position data acquisition unit 80, the image generating unit 82, the input receiving unit 84, the operation speed setting unit 86, and the program generating unit 88) can also be implemented in the controller 14. In this case, the processor of the controller 14 functions as the device 90.

Figure 9:
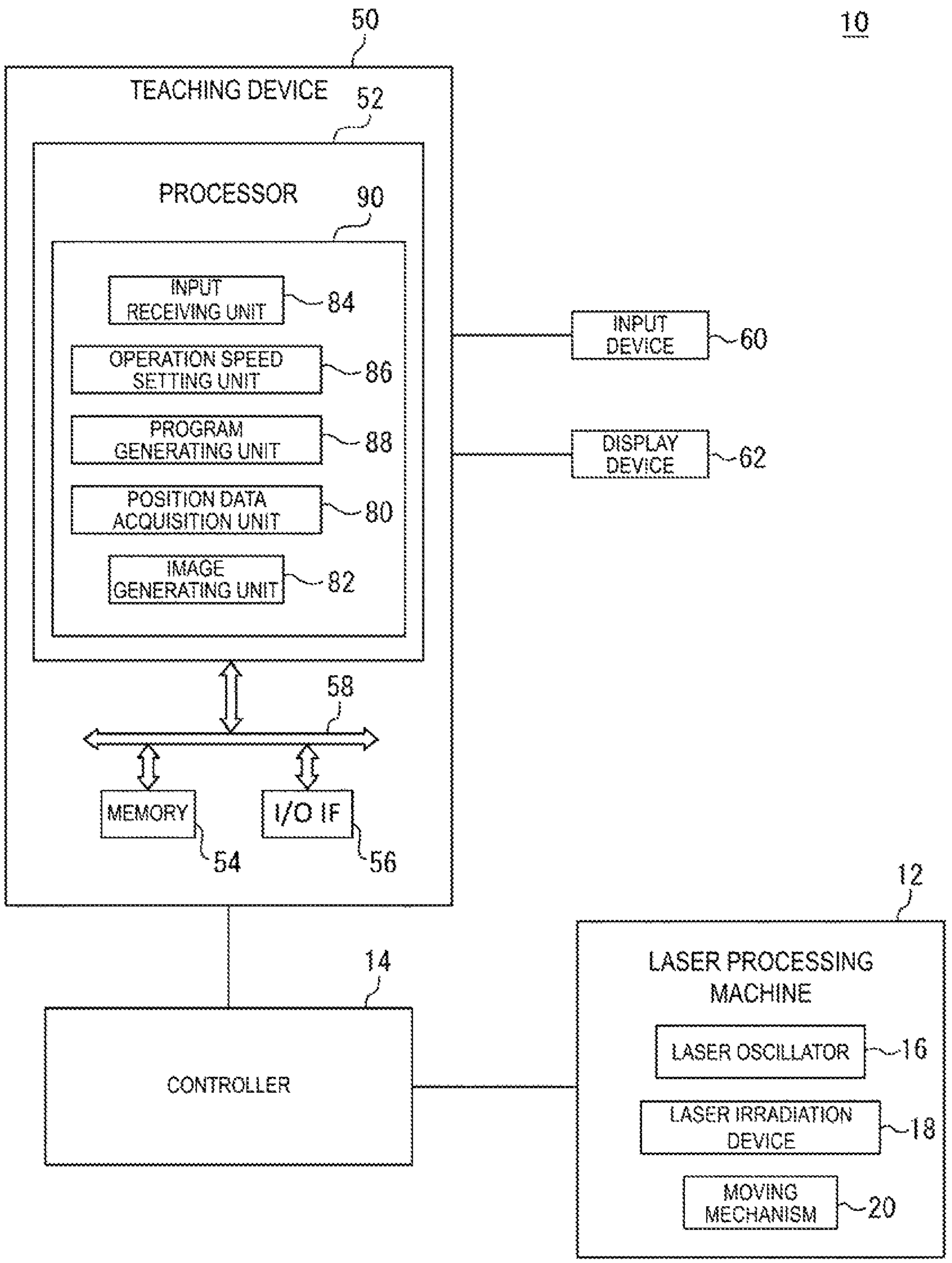
FIG. 9 is a block diagram illustrating another function of the laser processing system.

In the embodiment illustrated in FIGS. 2 and 9, the case in which the image generating units 68 and 82 generate the image data ID2 (FIG. 8) and ID3 (FIG. 11), respectively, has been described. However, no such limitation is intended, and the processor 52 may receive the input of the interference detection condition $CD_n$ or the operation parameter $PRi_n$, for example, by voice of the operator without generating the image data ID2 or ID3. In this case, the teaching device 50 is further provided with a microphone configured to receive an operator's voice input. That is, in this case, the image generating unit 68 or 82 can be omitted from the teaching device 50 or the device 90.

In the embodiment described above, the case in which the six process locations $PL_n$ are set in the workpiece 102 and the workpiece model 102M has been described. However, no such limitation is intended, and only one process location $PL_1$ may be set in the workpiece 102 and the workpiece model 102M, or any number of process locations $PL_n$ may be set. Alternatively, the process path PT is not limited to a quadrilateral as illustrated in FIG. 7, and may be set in any shape such as a triangle, a circle, or a straight line segment.

Figure 14:
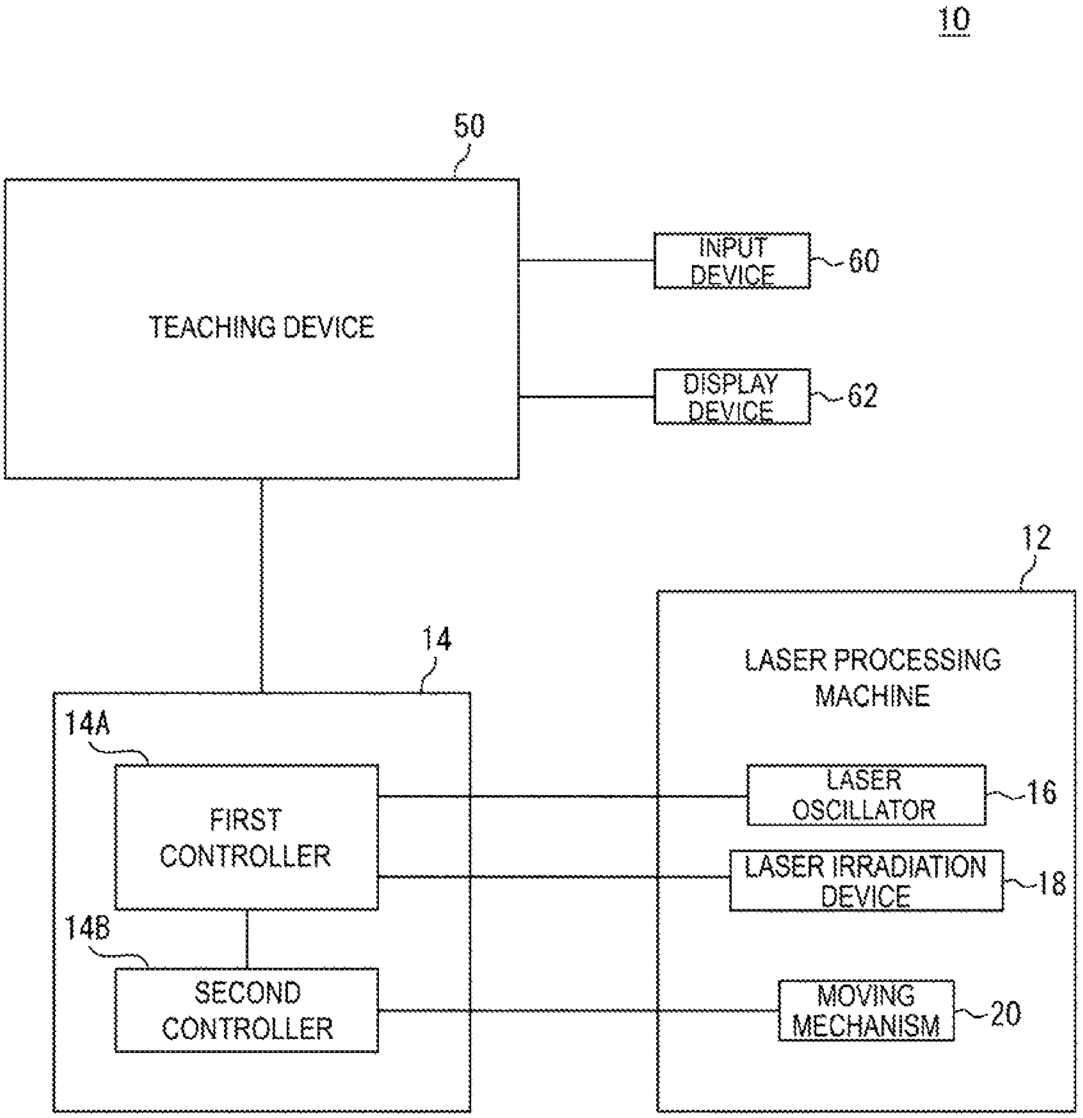
FIG. 14 is a block diagram of a laser processing system according to another embodiment.

The controller 14 described above may include a first controller 14A configured to control the operations of the laser oscillator 16 and the laser irradiation device 18, and a second controller 14B configured to control the operation of the moving mechanism 20. The above-mentioned aspect is illustrated in FIG. 14. The first controller 14A and the second controller 14B are computers each having a processor (a CPU, a GPU, or the like) and a memory (a ROM, a RAM, or the like), and are communicably connected to each other.

The first controller 14A and the second controller 14B execute the laser process operation LPO or the interference verification operation IVO while communicating with each other and while synchronizing the operations of the laser oscillator 16 and the laser irradiation device 18 with the operation of the moving mechanism 20. Although the present disclosure has been described through embodiments above, the embodiments described above do not limit the scope of the invention claimed in the claims.

REFERENCE SIGNS LIST

10: laser processing system
12: laser processing machine
14: controller
16: laser oscillator
18: laser irradiation device
20: moving mechanism
50: teaching device
52: processor
64: model data acquisition unit
66: operation generating unit
68, 82: image generating unit
70, 84: input receiving unit
72: interference detecting unit
74, 88: program generating unit
80: position data acquisition unit
86: operation speed setting unit
90: device

The invention claimed is:

1. A teaching device configured to teach an operation of a laser processing machine that performs a laser process on an object, the teaching device comprising:

a model data acquisition unit configured to acquire an object model modeling the object;

an input receiving unit configured to receive an input of an interference detection condition for detecting interference between a virtual laser beam and the object model in a virtual laser process operation in which the virtual laser beam is simulatively irradiated onto a process location set in the object model; and an interference detecting unit configured to detect the interference generated in the virtual laser process operation, based on the interference detection condition received by the input receiving unit, wherein the interference detection condition includes a beam size of the virtual laser beam, or an invalid area to be set for the object model to invalidate the detection of the interference.

2. The teaching device of claim 1, wherein the object includes a workpiece on which the laser process is performed, wherein the object model includes a workpiece model modeling the workpiece, wherein the input receiving unit receives, as the interference detection condition, an input of a distance from an irradiation position of the virtual laser beam on the workpiece model in order to set an area within a range of the distance as the invalid area.

3. The teaching device of claim 1, wherein the input receiving unit receives an input of the interference detection condition for each of a plurality of the process locations.

4. The teaching device of claim 1, further comprising an image generating unit configured to generate input image data for inputting the interference detection condition.

5. The teaching device of claim 1, wherein the model data acquisition unit further acquires a laser processing machine model modeling the laser processing machine, wherein the teaching device further comprises an operation generating unit configured to generate the virtual laser process operation in which the laser processing machine model is simulatively operated to irradiate the process location with the virtual laser beam, based on the object model, the laser processing machine model, and position data of the process location.

6. The teaching device of claim 5 further comprising a program generating unit configured to generate a process program for a laser process operation executed by the laser processing machine, based on the virtual laser process operation generated by the operation generating unit.

7. A method of teaching an operation of a laser processing machine configured to perform a laser process on an object, the method comprising:

acquiring, by a processor, model data of an object model modeling the object;

receiving, by the processor, an input of an interference detection condition for detecting interference between a virtual laser beam and the object model in a virtual laser process operation in which the virtual laser beam is simulatively irradiated onto a process location set in the object model; and detecting, by the processor, the interference generated in the virtual laser process operation, based on the received interference detection condition, wherein the interference detection condition includes a beam size of the virtual laser beam, or an invalid area to be set for the object model to invalidate the detection of the interference.

* * * * *